(12) United States Patent
Yoshida

(10) Patent No.: US 7,253,389 B2
(45) Date of Patent: *Aug. 7, 2007

(54) MOBILE BODY SURROUNDING SURVEILLANCE APPARATUS, MOBILE BODY SURROUNDING SURVEILLANCE METHOD, CONTROL PROGRAM AND COMPUTER-READABLE RECORDING MEDIUM

(75) Inventor: Shinichi Yoshida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/344,541

(22) Filed: Feb. 1, 2006

(65) Prior Publication Data

US 2006/0171562 A1 Aug. 3, 2006

(30) Foreign Application Priority Data

Feb. 1, 2005 (JP) ............................ 2005-025273

(51) Int. Cl.
*H01L 27/00* (2006.01)
(52) U.S. Cl. .................................... 250/208.1; 250/221
(58) Field of Classification Search ............. 250/208.1, 250/221, 201.1, 559.05; 340/435–438
See application file for complete search history.

(56) References Cited

U.S. PATENT DOCUMENTS 6,812,831 B2 * 11/2004 Ikeda ......................... 340/435

FOREIGN PATENT DOCUMENTS

| JP | 2000-285245 | 10/2000 |
| JP | 2005-222424 | 8/2005 |

* cited by examiner

*Primary Examiner*—Que T. Le
(74) *Attorney, Agent, or Firm*—Nixon & Vanderhye, PC

(57) ABSTRACT

A mobile body surrounding surveillance 1A apparatus according to the present invention includes: an image capturing section 2; a particular region setting section 31 for setting a particular region for image data captured by the image capturing section; an own mobile body movement direction detection section 11 for detecting a movement direction of the own mobile body and outputting a movement direction information indicating the detected movement direction; a movement vector information extraction section for taking the image data of the particular region for each of one or a plurality of frame images captured by the image capturing section in time series and adjusting a detection sensitivity based on the movement direction information so as to extract a movement vector information on another mobile body; and a change detection section 35 for detecting a moving state of the other mobile body which is present in the surrounding of the own mobile body based on the movement vector information.

22 Claims, 15 Drawing Sheets

Steering angle information: Defined that the right direction is a positive direction and the left direction is a negative direction

E

MOBILE BODY SURROUNDING SURVEILLANCE APPARATUS, MOBILE BODY SURROUNDING SURVEILLANCE METHOD, CONTROL PROGRAM AND COMPUTER-READABLE RECORDING MEDIUM

This Nonprovisional application claims priority under 35 U.S.C. §119(a) on Patent Application No. 2005-25273 filed in Japan on Feb. 1, 2005, the entire contents of which are hereby incorporated by reference.

BACKGROUND OF THE INVENTION

1. Field of the Invention

The present invention relates to a mobile body surrounding surveillance apparatus for surveillance of safety during movement of a manned or unmanned mobile body, such as a ship or a car (a vehicle, such as a two-wheeled vehicle (e.g., a motorcycle or a bicycle), a four-wheeled vehicle (e.g., an automobile), a train, etc.), a human or the like. For example, when a mobile body (own mobile body) moves laterally and there is a risk such that the mobile body contacts or collides with another mobile body (other mobile body) existing therearound, the mobile body surrounding surveillance apparatus is used to assist confirming the safety by warning a human involved with the mobile body by informing the danger caused by the approach of the other mobile body. The present invention also relates to a mobile body surrounding surveillance method using the mobile body surrounding surveillance apparatus, a control program for causing a computer to execute the mobile body surrounding surveillance method, and a computer-readable recording medium recording the control program.

2. Description of the Related Art

A recent increase in accidents of mobile bodies, such as traffic accidents (e.g., collision of automobiles, etc.) raises a significant public concern. Particularly, when moving an automobile to the left or right to make a lane change or turning right or left, a collision or crash frequently occurs in spite of the automobile driver's caution. The reason for such collision or crash is considered as follows: the automobile driver does not sufficiently confirm a rear and side direction with respect to the moving direction of his/her driving car (own mobile body) using a rearview mirror or the like; or there is another car (another mobile body) which is not covered by a rearview mirror or the like, i.e., a so-called blind spot.

To prevent such a traffic accident, for example, Japanese Laid-Open Publication No. 2000-285245 discloses a mobile body crash prevention apparatus which takes an image of a rear view using a camera mounted on a car, detects the presence of another car from the captured image, and employs an informing section to inform the driver of the car of the approach of another car by giving a warning, if there is a risk of collision or crash of another car coming in a rear and side direction when moving to the left or right (e.g., making a lane change, etc.) or turning left or right.

With the mobile body crash prevention apparatus, line edges which constitute a white line on a road or a ridge line of the road, and a vanishing point (point at infinity) which is an intersection of the line edges, are detected in each image of a plurality of frames captured in time series by the capturing section. Based on the white line and the ridge line and the positional information of the vanishing point, a detection region is narrowed. The detection region is divided into small regions (blocks). Movement amounts of the small regions between each frame are calculated by a technique called optical flow. In this case, the detection region is an image region E which is about a half of a screen indicated by slanted dashed lines in FIG. 12. The movement amount information of other vehicles thus calculated in the image region E is used to detect, for example, a passing car rapidly approaching from a rear and side direction of the own vehicle.

However, the conventional mobile body crash prevention apparatus of Japanese Laid-Open Publication No. 2000-285245 has the following problem.

When driving an own vehicle, a white line is detected to confirm a lane, a vanishing point is calculated to obtain the moving direction of another car, and optical flow is used to determine how each block obtained by dividing the detection region (image region E) is moved. Thus, advanced computation is required. In addition to the computation quality, the computation amount is huge, because the large image region E which is about a half of a screen indicated by slanted dashed lines in FIG. 12 is required as a detection region.

Thus, real-time processing cannot be performed due to the huge computation amount. To reduce the computation amount, a method of predicting a movement amount associated with the passage of time is used, for example. Therefore, the movement direction of another car cannot be correctly detected, likely leading to occurrence of error. Further, some roads may have no white lines, so that the movement amount of the mobile body cannot be calculated. Thus, the apparatus is not practical.

In order to solve the problem described above, the applicant proposes a method in Japanese Laid-Open Publication No. 2005-222424. The method is capable of monitoring the surrounding of a mobile body without performing a large amount of advanced computation by reducing the size of a detection region (image region E) and furthermore without performing a white line detection or a vanishing point tracing.

Hereinafter, a mobile body surrounding surveillance apparatus and a mobile body surrounding surveillance method using the same in embodiments of Japanese Laid-Open Publication No. 2005-222424 will be described with reference to the accompanying figures.

FIG. 13 is a block diagram showing a structure of a mobile body surrounding surveillance apparatus according to in an embodiment of Japanese Laid-Open Publication No. 2005-222424. FIG. 14 is a top view schematically showing the mobile body surrounding surveillance apparatus of FIG. 13 which is attached to an automobile and its vicinity.

As shown in FIG. 13, the mobile body surrounding surveillance apparatus 1 includes an image capturing section 2 for capturing an image of a surrounding of an automobile, a computation section 3 for executing a warning detection computation based on the captured image of a surrounding of an automobile to detect a risk due to the approach of another mobile body (described in detail later), and a change informing section 4 for giving a warning to a relevant person (driver) in accordance with warning detection information from the computation section 3.

The image capturing section 2 is a camera, such as an analog output camera, a digital output camera or the like. The image capturing section 2 is used to capture an image of a surrounding of an automobile. In FIG. 14, the image capturing section 2 is attached as an image capturing apparatus to an own mobile body 5 at a position (a top or bottom portion of a rearview mirror) which enables the image capturing apparatus to capture a rear and side view. The image capturing section 2 captures an image of a rear and side range which is a captured image region A indicated by slanted dashed lines in FIG. 14. Another mobile body 6 indicates another automobile which approaches the own mobile body 5 from a left and rear direction. When the image capturing section 2 is an analog output camera, an analog image signal is converted into a digital image signal by an A/D converter (not shown) before the image data is input to the computation section 3.

The computation section 3 includes a particular region setting section 31, an image processing section 32, a storage section 33, a change detection threshold setting section 34, and a change detection section 35. The computation section 3 detects the other mobile body 6 which is present in the vicinity of the own mobile body 5 from the image data captured by the image capturing section 2.

The particular region setting section 31 sets a particular region which is sufficiently small with respect to the image captured by the image capturing section 2. The particular region is a region (detection region) in which the image processing section 32 and the change detection section 35 detect the other mobile body 6 which is present in the vicinity of the own mobile body 5. A movement state of the other mobile body 6 relative to the own mobile body 5 (distance relationship between the own mobile body 5 and the other mobile body 6) varies. The particular region is defined as a rectangular (band-like, landscape (having a width greater than length)) region which is horizontally parallel to a frame image, with respect to the image captured by the image capturing section 2. Thus, the reason why such a particular region having a rectangular shape in the horizontal direction is provided is that the computation amount is significantly reduced, thereby making it possible to achieve real-time and effective computation.

From the image capturing section 2, the image processing section 32 receives image data of the particular region set by the particular region setting section 31 for each of a plurality of frame images captured in time series by the image capturing section 2. The image processing section 32 extracts movement vector information based on the received image data of the particular region by an extraction process described later. The extraction process of the movement vector information will be described later in detail with reference to FIGS. 15 and 16.

The storage section 33 temporarily stores a result of the extraction process by the image processing section 32. The storage section 33 has a memory structure as shown in FIG. 17. Specifically, the storage section 33 has a previous image data storage region 331, a current image data storage region 332 and a movement vector storage region 333. Among them, the previous image data storage region 331 and the current image data storage region 332 are switched on a frame-by-frame basis by switching the memory address.

The change detection threshold setting section 34 sets a change detection threshold so as to determine the movement state of the other mobile body 6 relative to the own mobile body 5 (so as to determine whether or not it is dangerous).

The change detection section 35 detects the other mobile body 6 which is present in the vicinity of the own mobile body 5 based on the movement vector information which is extracted by the image processing section 32 and is stored by the storage section 33, using a process described later. The change detection section 35 further determines whether or not the movement state of the other mobile body 6 relative to the own mobile body 5 (distance relationship between the own mobile body 5 and the other mobile body 6) is dangerous, based on the determination threshold set by the change detection threshold setting section 34. When the movement state of the other mobile body 6 relative to the own mobile body 5 (distance relationship between the own mobile body 5 and the other mobile body 6) exceeds the determination threshold, the change detection section 35 outputs warning detection information as a result of determination by the change detection section 35 to the change informing section 4. The detection process of the movement state of the other mobile body 6 relative to the own mobile body 5 will be described later in detail with reference to FIG. 18.

The change informing section 4 informs a driver of the own mobile body 5 of a danger by generating a warning sound or displaying a warning based on the movement state of the other mobile body 6 relative to the own mobile body 5 which is detected by the change detection section 35, such as, for example, warning detection information which is output when the other mobile body 6 is very close to the own mobile body 5 so that there is a risk of a crash (when the relative movement state exceeds the danger determination threshold).

The computation section 3 and the change informing section 4 are packaged into a single mobile body detection apparatus 10 of FIG. 14 and are accommodated in a front portion of a driver seat in an automobile. Therefore, it is possible for the driver to easily confirm a warning (a sound or a display).

Hereinafter, a mobile body surrounding surveillance method using the mobile body surrounding surveillance apparatus 1 of the embodiment thus constructed will be described.

FIG. 15(*a*) is an image diagram schematically showing a captured surrounding image of the own mobile body 5 captured by the image capturing section 2 of FIG. 13. FIG. 15(*b*) is an image diagram schematically showing a captured surrounding image of the own mobile body 5 captured by the image capturing section 2 at a time t (frame time; a time between temporally adjacent frames) after that of FIG. 15(*a*).

As shown in FIGS. 15(*a*) and 15(*b*), the image capturing section 2 captures a view in a rear and side direction from the own mobile body 5. It is shown that the other mobile body 6 is approaching the own mobile body 5 from the rear and side direction.

A particular region 7 is a region for checking a changed state of a captured image set by the particular region setting section 31. The particular region 7 is a rectangular (band-like, landscape) region which is horizontally parallel to a frame image, with respect to the image captured by the image capturing section 2. The particular region 7 does not contain a captured image of the own mobile body 5 and contains at least a portion of a captured image of the other mobile body 6.

The particular region 7 is processed by the image processing section 32 and the change detection section 35 to detect the movement state of the other mobile body 6 relative to the own mobile body 5 (distance relationship between the own mobile body 5 and the other mobile body 6).

In FIGS. 15(*a*) and 15(*b*), an object which is located at a side of a road and does not move, such as a utility pole 8 or the like, is shifted in a right direction indicated by arrow B in the captured image at a later time t. In contrast, an object which approaches the own mobile body 5 from a rear and side direction, such as the other mobile body 6 or the like, is shifted in a left direction indicated by arrow C in the captured image at the later time t as indicated by a position 9 of a left edge of the other mobile body 6 (a right edge in FIGS. 15(a) and 15(b)). Therefore, the object (the other mobile body 6) approaching the own mobile body 5 and the fixed (static) object (the utility pole 8) have opposite (different) moving directions (movement vectors) in the particular region 7. Thus, by using such movement vectors, the movement state of the other mobile body 6 relative to the own mobile body 5 (positional relationship or distance relationship between the own mobile body 5 and the other mobile body 6) can be accurately detected to detect the other mobile body 6 approaching the own mobile body 5, without using advanced computation, such as optical flow or the like, to calculate a vanishing point, a white line or the like.

Next, an exemplary process for extracting movement vector information using the image processing section 32 of FIG. 13 will be described in detail with reference to FIG. 16.

FIG. 16 is a flowchart for explaining the process for extracting movement vector information using the image processing section 32 of FIG. 13.

As shown in FIG. 16, in step S1, the particular region setting section 31 sets the particular region 7 with respect to an image captured by the image capturing section 2. As shown in FIGS. 15(a) and 15(b), the particular region 7 is a rectangular (landscape) region which is horizontally parallel to a frame image. A lateral position of the particular region 7 is set so that the captured image of the own mobile body 5 is not included and at least a portion of the captured image of the other mobile body 6 is included.

In step S2, image data corresponding to the particular region 7 is taken by the image processing section 32 from image data captured by the image capturing section 2.

In step S3, in order to obtain a movement vector in the particular region 7, the particular region 7 is divided into a plurality of regions, and a sum of image data values is calculated for each divided region. As the image data value to be summed, for example, a brightness signal can be used. Alternatively, any one or all of color signals (R, G, B, Y, U and V) may be used. The number of divisions of the particular region 7 may be increased, depending on the computation ability of the image processing section 32. Particularly, the size of each divided region is desirably 8×8 pixels or more in order to prevent erroneous detection due to noise or the like.

In step S4, the sum value of each divided region is stored in a corresponding divided region of the current image data storage region 332 in the storage section 33 (FIG. 17).

In step S5, the sum value data which has been stored in each divided region of the storage section 33 at an earlier time t, is read out from the previous image data storage region 331 of the storage section 33 of FIG. 17.

In step S6, current image data and previous image data are compared with each other so as to extract a divided region of the previous image data which has a minimum difference in sum value between the current image data and the previous image data, for each divided region of the current image data. The extracted divided region of the previous image data which has a minimum difference in sum value between the current image data and the previous image data, is considered to be a location at which the divided region of interest of the current image data was present at the earlier time t. Although an image captured at the earlier time t is the previous image herein, several images may be captured for time t.

In step S7, it is determined whether a positional relationship of the region extracted in step S6 between the previous image and the current image indicates "left" or "right". When the position of the extracted region in the previous image is left with respect to the position of the extracted region in the current image ("YES" in step S7), the process goes to step S8. When the position of the extracted region in the previous image is right with respect to the position of the extracted region in the current image ("NO" in step S7), the process goes to step S9.

In step S8, movement to the left is stored in the movement vector storage region 333 of the storage section 33 of FIG. 16 for individual divided regions.

In step S9, movement to the right is stored in the movement vector storage region 333 of the storage section 33 of FIG. 16 for individual divided regions.

As described with reference to FIGS. 15(a) and 15(b), the movement to the left indicates an object or the like (the other mobile body 6) approaching the own mobile body 5, while the movement to the right indicates an object or the like (the utility pole 8) which goes away from the own mobile body 5 or is fixed and does not move. Only left and right vector directions are extracted as movement vector information. In addition, if using a movement vector amount, a relative speed of the other mobile body 6 and the own mobile body 5 can be obtained.

In step S10, it is determined whether or not an instruction to end the process is input by the driver. Steps S2 to S9 are successively repeated until the process end instruction is input by the driver. When the process end instruction is input by the driver (YES), the process is ended.

Next, the process of detecting the movement state of the other mobile body 6 relative to the own mobile body 5 (distance relationship between the own mobile body 5 and the other mobile body 6) for determining danger by the change detection section 35 will be described in detail with reference to FIG. 18.

FIG. 18 is a flowchart for explaining an example of the process of detecting the movement state of the other mobile body 6 relative to the own mobile body 5 by the change detection section 35 of FIG. 13.

As shown in FIG. 18, in step S11, a change detection threshold (danger determination threshold) is set in the change detection threshold setting section 34. The change detection threshold is previously determined based on the size and position of the other mobile body 6. Typically, the change detection threshold is preferably set, based on the size and distance of the other mobile body 6, to be about a half of the number of divided regions.

In step S12, the image processing section 32 is used to read out the movement vector information stored in the movement vector storage region 333 of the storage section 33 to the change detection section 35.

In step S13, it is determined whether the movement vector information thus read out indicates "left" or "right". When the movement vector information indicates "left" ("YES" in step S13), the process goes to step S14. In step S14, a left movement vector number (the number of left movement vectors) is incremented. When the movement vector information indicates "right" ("NO" in step S13), the process goes to step S15.

In step S15, steps S12 to S14 are repeated until all divided regions are processed. As a result, a left movement vector number from the earlier time t to the current time (the incremented value of the left movement vector number) is calculated. Herein, the left movement vector number is calculated. Conversely, when the image capturing section 2 is be placed on a left side of the own mobile body 5, a movement vector having a right direction indicates the approach of the own mobile body 5 and the other mobile body 6. In this case, aright movement vector number (the number of right movement vectors) is calculated.

In step S16, when the left movement vector number (incremented value) thus calculated is greater than the danger determination threshold set in step S11, it is determined that there is the other mobile body 6 approaching the own mobile body 5.

In step S17, the change informing section 4 is used to inform the driver of the own mobile body 5 of a risk due to the approach of the other mobile body 6 via a warning sound, a warning display or the like to draw the driver's attention to the risk. Herein, when the other mobile body 6 approaching the own mobile body 5 has a risk of crash or the like, a warning sound or a warning display is output. Alternatively, a warning sound or a warning display may be output when the other mobile body 6 approaches the own mobile body 5 but is considered to be safe. Warning may be given via vibration, heat or the like in addition to a sound or a display (e.g., an image, light, etc.). With such a warning, the driver can become aware of a risk of collision or crash of the own mobile body 5 and the other mobile body 6, and therefore, can avoid collision, crash or the like of the cars. Also herein, the change (warning) is given to the driver of the own mobile body 5. Alternatively, the change (warning) may also be given to the driver of the other mobile body 6, or alternatively, others who are present outside (around) the mobile bodies.

In step S18, it is determined whether or not the process end instruction is input by the driver. Steps S12 to S17 are successively repeated until the process end instruction is input by the driver. When the process end instruction is input by the driver (YES), the process is ended.

As described above, according to the mobile body surrounding surveillance apparatus 1 and the method using the mobile body surrounding surveillance method, the particular region setting section 31 is used to set the rectangular (landscape) particular region 7 which is parallel to the horizontal direction of a frame image, with respect to image data captured by the image capturing section 2. The image processing section 32 is used to take image data of the particular region 7 for each of a plurality of frame images and extract a movement vector from the image data. Further, when a sum value of vector values in a predetermined direction (in movement vector information) exceeds the threshold set by the change detection threshold setting section 34, the change detection section 35 determines that the other mobile body 6 is close to the own mobile body 5 to a dangerous level and the change informing section 4 is used to inform the driver of the risk via a warning sound, a warning display or the like to draw the driver's attention. Thus, the other mobile body 6 present in a surrounding of the own mobile body 5 can be accurately and reliably detected in real time without advanced computation or a large computation amount which are required for conventional techniques. Therefore, when there is a risk of collision, crash or the like, it is possible to give a warning to the driver to avoid the risk.

However, the mobile body surrounding surveillance apparatus and the mobile body surrounding surveillance method using the same disclosed in Japanese Laid-Open Publication No. 2005-222424 have the following problems.

FIG. 19 shows a top view of the image diagram shown in FIG. 15. In FIG. 19, streets are assumed to be straight. In FIG. 19, reference numerals 5, 6 and 8 denote the own mobile body 5, the other mobile body 6 and the utility pole 8 shown in FIG. 15(a), respectively. In FIG. 19, the own mobile body 5 and the other mobile body 6 in FIG. 15(b) at a time t after that of FIG. 15(a) are denoted 5' and 6', respectively. The utility pole 8 is located at the same position at the later time t since the utility pole is an object in a fixed position.

The extraction of the movement vector information corresponds to projecting the other mobile body 6 or the surrounding objects in a fixed position (e.g., utility pole 8) of the other mobile body 6 onto a projection plane fixed on the own mobile body 5 and thereafter, observing the movement of the positions of the projected objects in either the left or right direction. The movement vector B of the utility pole 8 and the movement vector. C of the other mobile body 6 shown in FIG. 15 correspond to the movement vectors B and C denoted by the same reference numerals in the projection plane at the later time t in FIG. 19, respectively.

It is assumed that the angle of the other mobile body 6 viewed from the own mobile body 5 at the time of FIG. 15(a) (previous image) is $\alpha$ and the angle of the other mobile body 6' viewed from the own mobile body 5' at the time of FIG. 15(b) (current image), which at the later time t, is $\beta$. When the other mobile body 6 is approaching the own mobile body 5, the relationship $\alpha<\beta$ is satisfied. In other words, when the movement vector in the left direction is detected, it is determined that there exists an object (another mobile body 6) which is approaching the own mobile body 5.

FIG. 20 shows a top view showing a case where the own mobile body 5 is not moving straight (e.g., a case where the own mobile body 5 is approaching a right curved street from a straight street). In FIG. 20, the own mobile body 5 and the other mobile body 6 are both moving straight and at the later time t, the own mobile body 5' is approaching the right curved street and the other mobile body 6' continues to be moving straight.

When the own mobile body 5 is moving straight as shown in FIG. 19, the projection plane before the passing of the time t and the projection plane after the passing of the time t are parallel to each other. However, when the own mobile body 5 is approaching the right curved street as shown in FIG. 20, the position of the other mobile body 6 projected onto the projection plane is different from the one when the own mobile body 5 is moving straight since the projection plane is inclined.

In the case of FIG. 20, it is assumed that the angle of the other mobile body 6 viewed from the own mobile body 5 before the passing of the time t (previous image) is $\alpha$, the angle of the other mobile body 61 viewed from the own mobile body 5' after the passing of the time t is $\beta$. Even if the relationship $\alpha<\beta$ is satisfied and the movement vector in the left direction is detected, it can not be determined whether or not the other mobile body 6 is approaching the own mobile body 5.

Similar to this case, when the own mobile body 5 is approaching the left curved street from the straight street, there is a possibility that the other mobile body 6 is approaching the own mobile body 5 even if the relationship $\alpha>\beta$ is satisfied and the movement vector in the right direction is detected.

As described above, it is determined whether or not there exists the other mobile body 6 which is approaching the own mobile body 5 by detecting the movement vector in the left direction in Japanese Laid-Open Publication 2005-222424. However, this is only effective when the own mobile body 5 and the other mobile body 6 are both moving straight or moving on a curved street with a constant curvature. Thus, when the own mobile body 5 is approaching a curved street or the curvature of the curved street itself changes, there is a problem that the approaching mobile body 6 can not be necessarily accurately detected.

The present invention is made to solve the problems described above. The objective of the present invention is to provide: a mobile body surrounding surveillance apparatus capable of detecting another mobile body in the surrounding of an own mobile body with high precision in real time without requiring a large amount of an advanced computation and further capable of detecting danger, which has not been readily detected, by automatically adjusting the sensitivity of detecting the other mobile body approaching the own mobile body in accordance with a change of movement direction of the own mobile body by detecting the movement direction of the own mobile body; a mobile body surrounding surveillance method using the mobile body surrounding surveillance apparatus; a control program for causing a computer to execute the mobile body surrounding surveillance method; and a computer-readable recording medium has recorded thereon the control program.

SUMMARY OF THE INVENTION

A mobile body surrounding surveillance apparatus according to the present invention includes: an image capturing section for capturing an image in a surrounding of an own mobile body; a particular region setting section for setting a particular region for image data captured by the image capturing section, the particular region being parallel to the horizontal direction of a frame image and rectangular having a long edge in the horizontal direction; an own mobile body movement direction detection section for detecting a movement direction of the own mobile body and outputting a movement direction information indicating the detected movement direction; a movement vector information extraction section for taking the image data of the particular region for each of one or a plurality of frame images captured by the image capturing section in time series and adjusting a detection sensitivity based on the movement direction information so as to extract a movement vector information on another mobile body; and a change detection section for detecting a moving state of the other mobile body which is present in the surrounding of the own mobile body based on the movement vector information, thereby the objective above mentioned being achieved.

Preferably, the image capturing section in the mobile body surrounding surveillance apparatus according to the present invention is mounted on a position of the own mobile body such that the image capturing section can capture an image in a rear and side direction.

Furthermore, preferably, the own mobile body is a vehicle, and the image capturing section in the mobile body surrounding surveillance apparatus according to the present invention is mounted on a side mirror or a door mirror of at least one of a side of a driver's seat and a side opposite to the driver's seat.

Furthermore, preferably, the particular region setting section in the mobile body surrounding surveillance apparatus according to the present invention sets the particular region for the captured image data such that a captured image of the own mobile body is not included in the image data and at least a portion of a captured image of the other mobile body is included in the image data.

Furthermore, preferably, the own mobile body movement direction detection section in the mobile body surrounding surveillance apparatus according to the present invention detects the movement direction of the own mobile body in accordance with an operation direction when a moving direction control section of the own mobile body is operated.

Furthermore, preferably, the moving direction control section in the mobile body surrounding surveillance apparatus according to the present invention is a steering wheel, an operation angle information of the steering wheel increases or decreases in accordance with an operation angle in a positive direction or a negative direction, the positive direction being defined as a direction when the steering wheel is steered to the right and the negative direction is defined as a direction when the steering wheel is steered to the left.

Furthermore, preferably, the movement vector information in the mobile body surrounding surveillance apparatus according to the present invention includes a movement amount and direction information indicating a moving state of the other mobile body which is present in the surrounding of the own mobile body.

Furthermore, preferably, the movement vector information extraction section in the mobile body surrounding surveillance apparatus according to the present invention compares a sum value of a current image data and a sum value of a previous image data time t (t>0) before for each of a plurality of divided regions of the particular region, respectively; extracts divided regions between which the difference of the sum values is minimum; determines a position of the extracted divided region of the previous image data as a position of the divided region of the current image data time t before; and extracts a positional relationship between the extracted divided region of the previous image data and the extracted divided region of the current image data as the movement amount of the movement vector information and extracts the direction information of the movement vector information based on the movement direction information.

Furthermore, preferably, the movement vector information extraction section in the mobile body surrounding surveillance apparatus according to the present invention determines whether the divided region of the current image data is shifted to the left or right with respect to the divided region of the previous image data based on the positional relationship between the extracted divided regions; increases or decreases a sensitivity setting threshold which is used to extract the direction information of the movement vector information in accordance with the movement direction information; compares the movement amount of the movement vector information and the sensitivity setting threshold; and extracts the direction information of the movement vector information which indicates that the other mobile body is approaching the own mobile body, when the movement amount of the movement vector information is greater than or equal to the sensitivity setting threshold.

Furthermore, preferably, the movement vector information extraction section in the mobile body surrounding surveillance apparatus according to the present invention includes: a dividing section for dividing image data of the particular region which is a portion of image data of the captured image data into a plurality of divided regions; a sum value calculating section for calculating a sum of the image data values for each divided region; a divided region extraction section for extracting one of the divided regions of previous image data having a minimum difference in sum value between the previous image data and current image data, for each divided region of the current image data; a left/right determination section for determining whether the divided region of the current image data which gives the minimum difference is located to the left or right with respect to the extracted divided region of the previous image data; and a movement vector information determination section for determining a direction information of the movement vector information as left movement vector information when the divided region of the current image data is located to the left and as right movement vector information when the divided region of the current image data is located to the right.

Furthermore, preferably, the own mobile body is a vehicle, and the left/right determination section in the mobile body surrounding surveillance apparatus according to the present invention includes: an operation angle increasing determination section for determining whether or not the operation angle of a steering wheel of the own mobile body is increasing; a detection sensitivity control section for, when the operation angle is increasing, increasing a sensitivity setting threshold used to determine whether or not the other mobile body is approaching the own mobile body based on the movement amount of the movement vector information so as to weaken the detection sensitivity for the movement vector information and, when the operation angle is not increasing, maintaining or decreasing the sensitivity setting threshold so as to maintain or strengthen the detection sensitivity for the movement vector information; and a comparison and determination section for comparing the movement amount of the movement vector information with the sensitivity setting threshold and determines whether or not the movement amount of the movement vector information is greater than or equal to the sensitivity setting threshold so as to determine whether the divided region of the current image data which gives the minimum difference is located to the left or right.

Furthermore, preferably, the own mobile body is a vehicle, and the left/right determination section in the mobile body surrounding surveillance apparatus according to the present invention includes: an operation angle increasing determination section for determining whether or not the operation angle of a steering wheel of the own mobile body is increasing; a detection sensitivity control section for, when the operation angle is increasing, decreasing a sensitivity setting threshold used to determine whether or not the other mobile body is approaching the own mobile body based on the movement amount of the movement vector information so as to strengthen the detection sensitivity for the movement vector information and, when the operation angle is not increasing, maintaining or increasing the sensitivity setting threshold so as to maintain or weaken the detection sensitivity for the movement vector information; and a comparison and determination section for comparing the movement amount of the movement vector information with the sensitivity setting threshold and determines whether or not the movement amount of the movement vector information is greater than or equal to the sensitivity setting threshold so as to determine whether the divided region of the current image data which gives the minimum difference is located to the left or right.

Furthermore, preferably, the change detection section in the mobile body surrounding surveillance apparatus according to the present invention detects a moving state of the other mobile body relative to the own mobile body based on the movement vector information.

Furthermore, preferably, the change detection section in the mobile body surrounding surveillance apparatus according to the present invention reads the movement vector information for each of the plurality of divided regions of the particular region; and detects that there exists the other mobile body which is dangerously approaching the own mobile body when the sum value of the number of the vector movement amounts of a predetermined direction information among the read movement vector information is greater than a predetermined determination threshold.

Furthermore, preferably, the change detection section in the mobile body surrounding surveillance apparatus according to the present invention calculates, as the direction information, the number of vector in the left direction when the image capturing section is mounted on the right side of the own mobile body and calculates, as the direction information, the number of vector in the right direction when the image capturing section is mounted on the left side of the own mobile body.

Furthermore, preferably, the mobile body surrounding surveillance apparatus according to the present invention includes a change informing section for outputting a warning in accordance with the moving state of the other mobile body relative to the own mobile body, the moving state being detected by the change detection section.

Furthermore, preferably, the mobile body surrounding surveillance apparatus according to the present invention further includes a storage section for temporarily storing a result extracted by the movement vector information extraction section, wherein the change detection section reads the result extracted by the movement vector information extraction section from the storage section for processing the change detection.

A mobile body surrounding surveillance apparatus according to the present invention includes: an image capturing step of capturing an image data in a surrounding of an own mobile body as a frame image, the image data being captured by an image capturing section in time series; a setting step of setting a particular region which is parallel to the horizontal direction of the frame image and rectangular having a long edge in the horizontal direction for each of one or a plurality of captured frame images; an own mobile body movement direction detection step of detecting a movement direction of the own mobile body and outputting a movement direction information indicating the detected movement direction; a movement vector information extraction step of taking the image data of the particular region for each of one or the plurality of the captured frame images and extracting a movement vector information on another mobile body based on the image data of the particular region and the movement direction information; and a change detection step of detecting a moving state of the other mobile body which is present in the surrounding of the own mobile body based on the movement vector information, thereby the objective above mentioned being achieved.

Preferably, the movement vector information extraction step in the mobile body surrounding surveillance method apparatus according to the present invention includes: a dividing step of dividing image data of the particular region which is a portion of image data of the captured image data into a plurality of divided regions; a sum value calculating step of calculating a sum of the image data values for each divided region; a divided region extraction step of extracting one of the divided regions of previous image data having a minimum difference in sum value between the previous image data and current image data, for each divided region of the current image data; a left/right determination step of determining whether the divided region of the current image data which gives the minimum difference is located to the left or right with respect to the extracted divided region of the previous image data; and a movement vector information determination step of determining a direction information of the movement vector information as left movement vector information when the divided region of the current image data is located to the left and as right movement vector information when the divided region of the current image data is located to the right.

Furthermore, preferably, the own mobile body is a vehicle, and the left/right determination step in the mobile body surrounding surveillance method includes: an operation angle increasing determination step of determining whether or not the operation angle of a steering wheel of the own mobile body is increasing; a detection sensitivity control step of, when the operation angle is increasing, increasing a sensitivity setting threshold used to determine whether or not the other mobile body is approaching the own mobile body based on the movement amount of the movement vector information so as to weaken the detection sensitivity for the movement vector information and, when the operation angle is not increasing, maintaining or decreasing the sensitivity setting threshold so as to maintain or strengthen the detection sensitivity for the movement vector information; and a comparison and determination step of comparing the movement amount of the movement vector information with the sensitivity setting threshold and determines whether or not the movement amount of the movement vector information is greater than or equal to the sensitivity setting threshold so as to determine whether the divided region of the current image data which gives the minimum difference is located to the left or right.

Furthermore, preferably, the own mobile body is a vehicle, and the left/right determination step in the mobile body surrounding surveillance method includes: an operation angle increasing determination step of determining whether or not the operation angle of a steering wheel of the own mobile body is increasing; a detection sensitivity control step of, when the operation angle is increasing, decreasing a sensitivity setting threshold used to determine whether or not the other mobile body is approaching the own mobile body based on the movement amount of the movement vector information so as to strengthen the detection sensitivity for the movement vector information and, when the operation angle is not increasing, maintaining or increasing the sensitivity setting threshold so as to maintain or weaken the detection sensitivity for the movement vector information; and a comparison and determination step of comparing the movement amount of the movement vector information with the sensitivity setting threshold and determines whether or not the movement amount of the movement vector information is greater than or equal to the sensitivity setting threshold so as to determine whether the divided region of the current image data which gives the minimum difference is located to the left or right.

A control program according to the present invention causes a computer to execute each step of the mobile body surrounding surveillance method described above, thereby the objective above mentioned being achieved.

A computer-readable recording medium according to the present invention has recorded thereon the control program described above, thereby the objective above mentioned being achieved.

Hereinafter, functions of the present invention will be described.

According to the present invention, movement vector information is extracted based on image data in a particular region between temporally adjacent frame images and the detection sensitivity of the movement vector information is adjusted in accordance with the change of the moving direction of the own mobile body and extracted as another mobile body approaching information. Another mobile body present in a surrounding (e.g., a rear and side direction) of an own mobile body can be detected based on the other mobile body approaching information. The detection range can be limited to a particular region. The present invention can be achieved without advanced computation, such as a technique of obtaining a vanishing point, a white line or the like, optical flow, or the like, which is conventionally required.

Therefore, it is possible to detect a movement state of the other mobile body relative to the own mobile body with a smaller amount of computation without advanced computation. Therefore, it is possible to produce a mobile body surrounding surveillance apparatus with low cost and without an expensive CPU having high-speed processing performance or the like. Thus, the computation amount is small and real-time (high-speed) computation can be achieved. Therefore, it is not necessary to calculate and predict a movement amount associated with the passage of time, thereby further improving detection accuracy.

The detection process is performed based on image data of each landscape, band-like particular region which is parallel to a frame image among a plurality of frame images, thereby simplifying computation. Therefore, it is possible to reduce errors due to noise or the like. Thus, the detection accuracy can be further improved.

Furthermore, by adjusting the detection sensitivity of the movement vector information based on the movement direction information of the own mobile body, not only in the case that the own mobile body and the other mobile body both move straight or moving on a curved street with a constant curvature, but also in the case that the own mobile body is approaching a curved street or the curvature of the curved street itself changes, the other mobile body which is approaching to the vicinity of the own mobile body is correctly detected, thereby capable of detecting the danger.

As described above, according to the present invention, by detecting the moving direction of the own mobile body, the sensitivity for detecting the other mobile body approaching the own mobile body is automatically adjusted in accordance with the moving direction of the own mobile body so as to improve the detection accuracy.

A surrounding of an own mobile body is monitored using an image capturing section (e.g., a camera, etc.) to check whether or not there is another mobile body in a moving direction (e.g., a rear and side direction, etc.) when moving the own mobile body to the left or right or turning left or right. When there is a risk of crash, a warning is given to the driver. Therefore, the present invention is useful for prevention of a crash due to an error in confirmation (e.g., visual confirmation, etc.).

These and other advantages of the present invention will become apparent to those skilled in the art upon reading and understanding the following detailed description with reference to the accompanying figures.

BRIEF DESCRIPTION OF THE DRAWINGS

FIG. 15(*b*) is an image diagram schematically showing an image, in the surrounding of the own mobile body, captured by the image capturing section time t after (frame period; time between the previous frame and the current frame) that of FIG. 15(*a*).

DESCRIPTION OF THE PREFERRED EMBODIMENTS

Hereinafter, a mobile body surrounding surveillance apparatus according to the present invention and a mobile body surrounding surveillance method using the same will be described by way of Embodiments 1 and 2 with reference to the accompanying drawings, where they are applied to an automobile.

In the following description, an automobile is described as an example of a mobile body. The present invention is not limited to automobiles and can be applied to a manned or unmanned mobile body, such as a ship or a car (a vehicle, such as a two-wheeled vehicle (e.g., a motorcycle or a bicycle), a four-wheeled vehicle (e.g., an automobile), a train, etc.), a human or the like.

Embodiment 1

Figure 1:
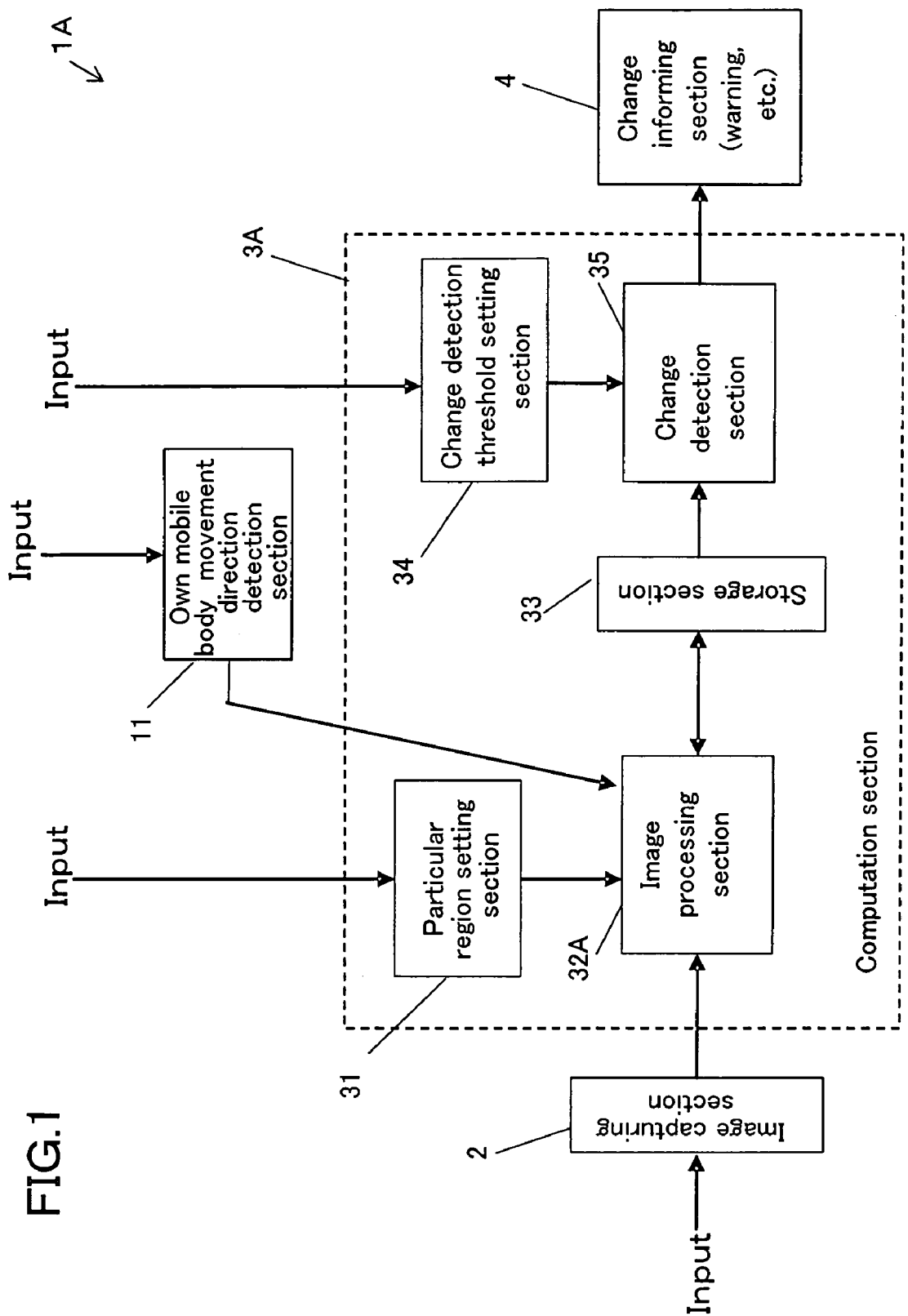
FIG. 1 is a block diagram showing a structure of a mobile body surrounding surveillance apparatus according to Embodiment 1 of the present invention.
Figure 2:
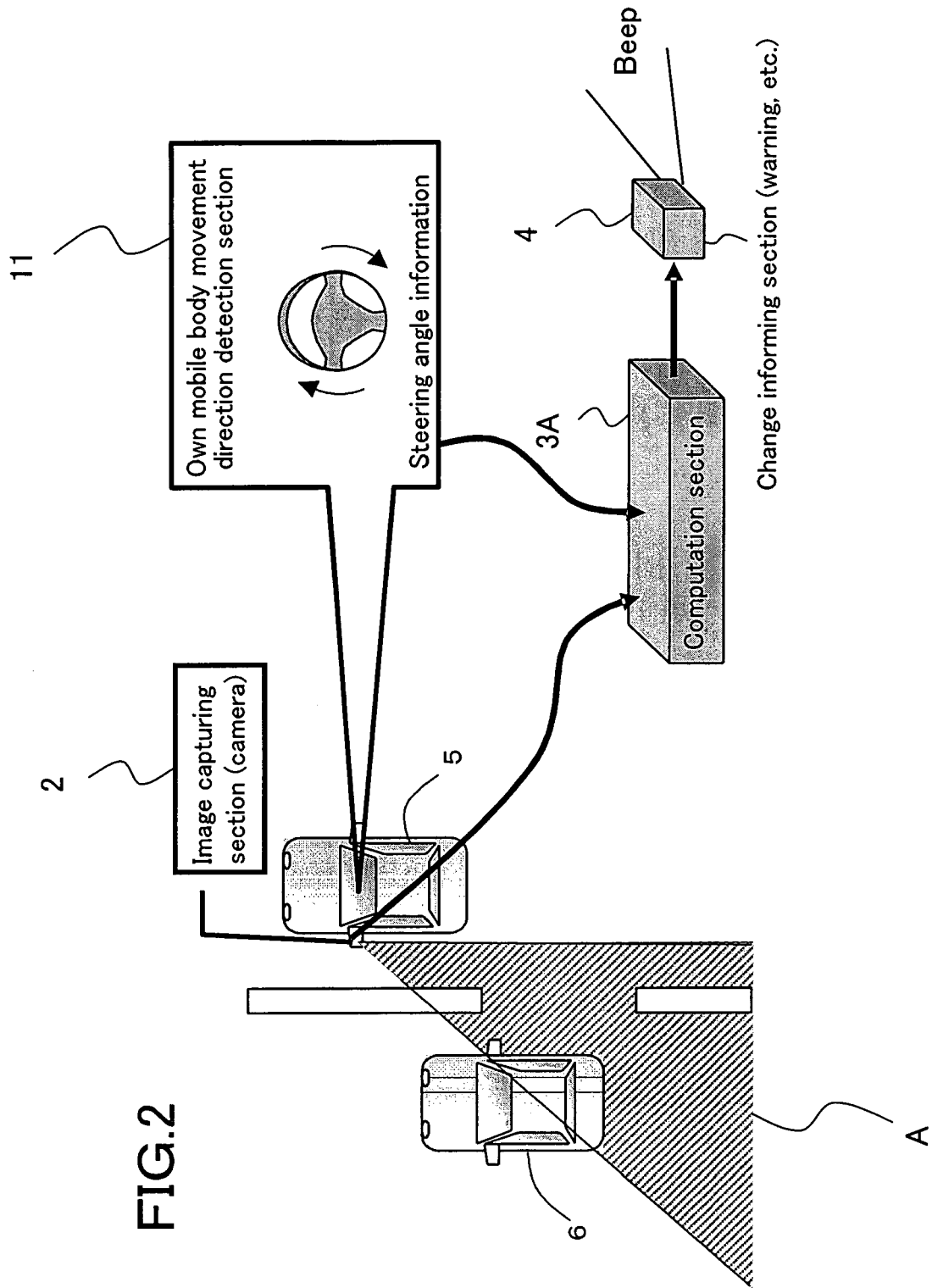
FIG. 2 is a top view schematically showing the mobile body surrounding surveillance apparatus of FIG. 1 which is attached to an automobile and its vicinity.
Figure 13:
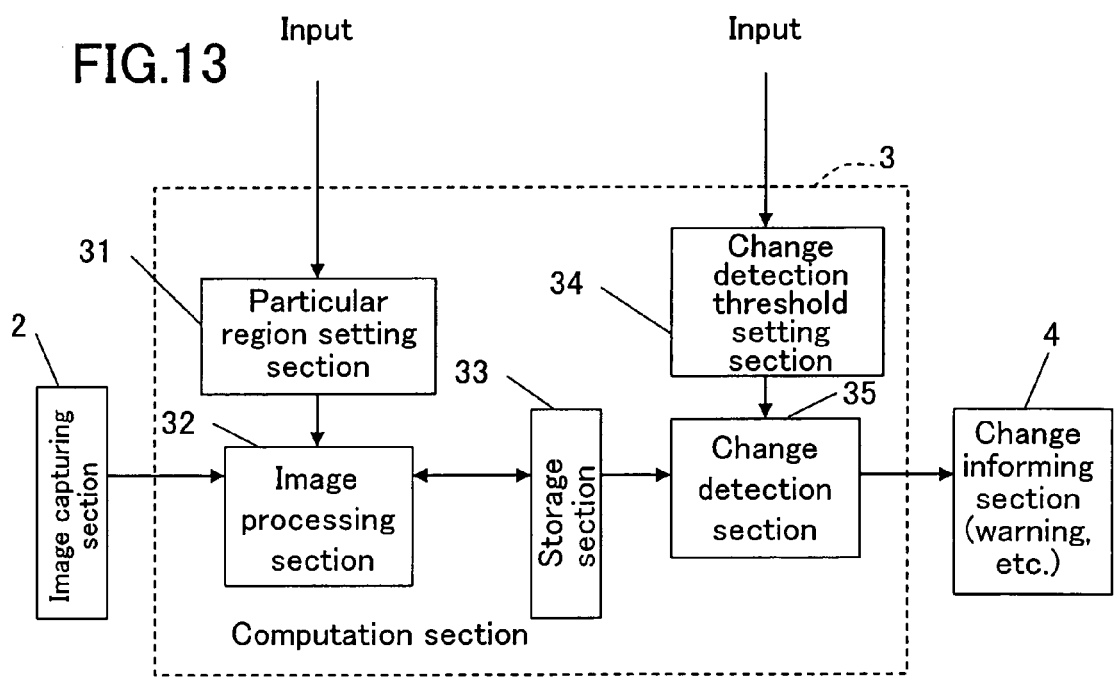
FIG. 13 is a block diagram showing a structure of the mobile body surrounding surveillance apparatus in an embodiment of Japanese Laid-Open Publication No. 2005-222424.
Figure 14:
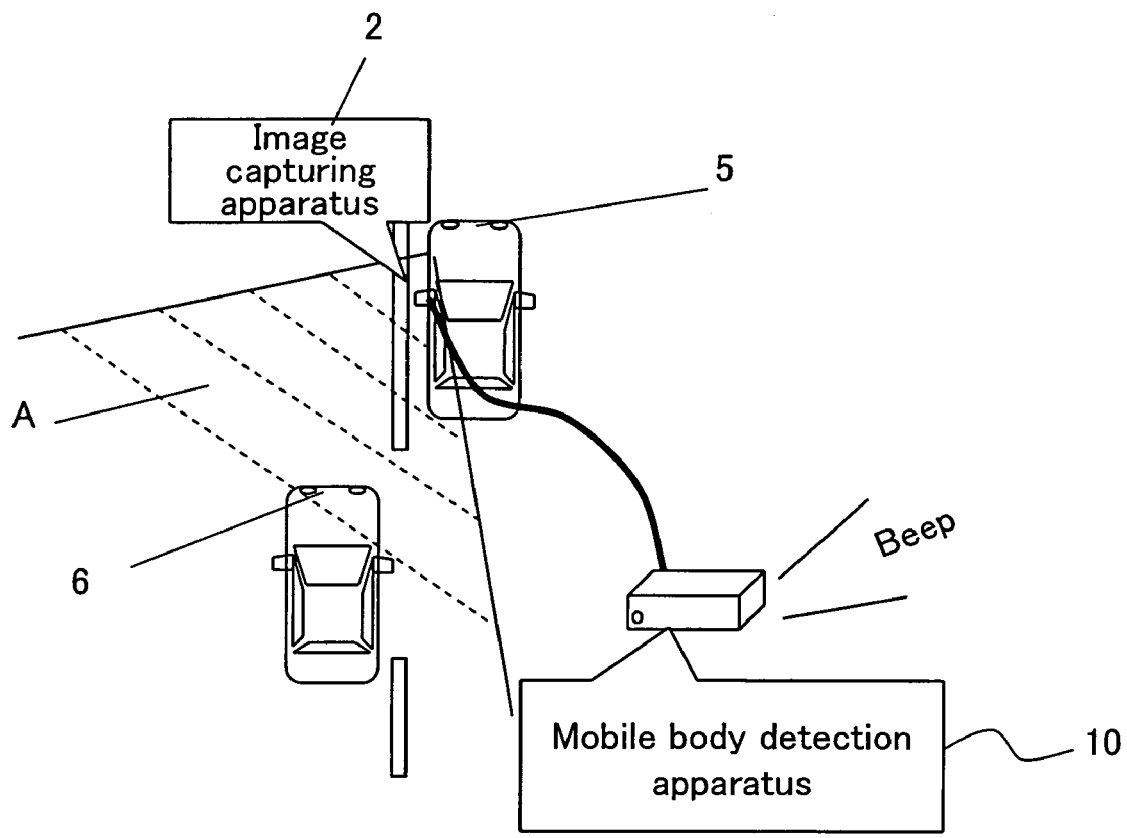
FIG. 14 is a top view schematically showing a case where the mobile body surrounding surveillance apparatus in FIG. 13 is mounted on an automobile.

FIG. 1 is a block diagram showing a structure of a mobile body surrounding surveillance apparatus according to Embodiment 1 of the present invention. FIG. 2 is a top view schematically showing the mobile body surrounding surveillance apparatus of FIG. 1 which is attached to an automobile and its vicinity. In FIGS. 1 and 2, the elements having the same functions as those in FIGS. 13 and 14 in Japanese Laid-Open Publication No. 2005-222424 by the present applicant are denoted by the same reference numerals.

As shown in FIG. 1, the mobile body surrounding surveillance apparatus 1A of Embodiment 1 of the present invention includes an own mobile body movement direction detection section 11 for detecting a movement direction of the own mobile body, an image capturing section 2 for capturing an image of a surrounding of an automobile, a computation section 3A for executing a warning detection computation to detect a risk due to the approach of another mobile body (described later in detail), based on the image of the surrounding of the automobile captured by the image capturing section 2 and the movement direction information of the own mobile body detected by the own mobile body movement direction detection section 11, and a change informing section 4 for giving a warning to a relevant person (driver) in accordance with warning detection information from the computation section 3A.

As shown in FIG. 2, the own mobile body movement detection section 11 detects a movement direction (an operation direction) of the own mobile body 5 based on a steering angle information (an operation angle information) when a steering wheel (a moving direction control section) of the own mobile body 5 is operated. The own mobile body movement detection section 11 outputs, to an image processing section 32A, the movement direction information of the own mobile body 5 in accordance with the detected movement direction (operation direction). The operation angle information on the steering wheel increases or decreases in accordance with the steering angle. The steering angle is defined as an angle in a positive direction when the steering wheel is steered to the right. The steering angle is defined as an angle in a negative direction when the steering wheel steered to the left.

The image capturing section 2 is a camera, such as an analog output camera, a digital output camera or the like. The image capturing section 2 is used to capture an image of a surrounding of an automobile. In FIG. 2, the image capturing section 2 is attached as an image capturing apparatus to an own mobile body 5 at a position (a top or bottom portion of a rearview mirror) which enables the image capturing apparatus to capture a rear and side view. The image capturing section 2 captures an image of a rear and side range on the left side which is a captured image region A indicated by a black color in FIG. 2. Another mobile body 6 indicates another automobile which approaches the own mobile body 5 from a left and rear direction. When the image capturing section 2 is an analog output camera, an analog image signal is converted into a digital image signal by an A/D converter (not shown) before the image data is input to the computation section 3.

The computation section 3A includes a particular region setting section 31, an image processing section 32A as a movement vector information extraction section, a storage section 33, a change detection threshold setting section 34 and a change detection section 35. The computation section 3A retrieves an image data of a setting particular region from the image data captured by the image capturing section 2 and adjust a detection sensitivity based on the movement direction information, of the own mobile body 5, detected by the own mobile body movement direction detection section 11. Thereafter, the computation section 3A performs a computation for detecting a movement vector information indicating a moving state of the other mobile body 6 which is present in the surrounding of the own mobile body 5.

Figure 15:
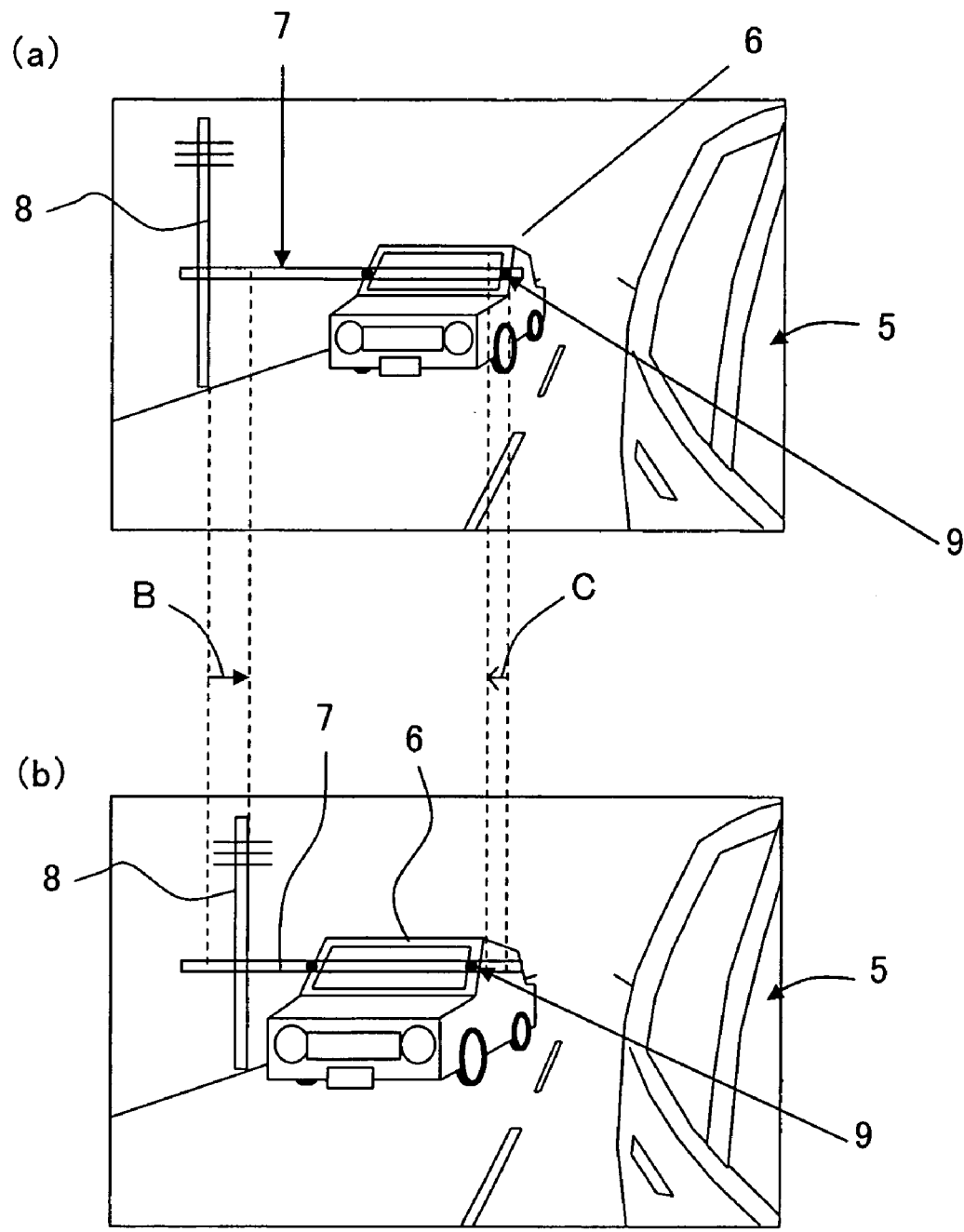
FIG. 15(*a*) is an image diagram schematically showing an image, in the surrounding of the own mobile body, captured by the image capturing section shown in FIG. 13.

The particular region setting section 31 sets a particular region 7 which is sufficiently small with respect to the image captured by the image capturing section 2. The particular region 7 (see FIG. 15(*a*)) is a detection region in which the image processing section 32 and the change detection section 35 detect the other mobile body 6 which is present in the vicinity of the own mobile body 5. A movement state of the other mobile body 6 relative to the own mobile body 5 (whether or not the other mobile body 6 is approaching the own mobile body 5 and distance relationship between the own mobile body 5 and the other mobile body 6) varies in the particular region 7. The particular region 7 is defined as a rectangular (band-like, landscape (having a width greater than length)) region which is horizontally parallel to a frame image, with respect to the image captured by the image capturing section 2. Thus, the reason why such a particular region is provided is that the computation amount is significantly reduced, thereby making it possible to achieve real-time and effective computation.

From the image capturing section 2, the image processing section 32A receives image data of the particular region 7 set by the particular region setting section 31 for each of one or a plurality of frame images captured in time series by the image capturing section 2. The image processing section 32A extracts movement vector information based on the received image data of the particular region 7 by an extraction process described later. The image processing section 32A adjusts a detection sensitivity of a movement vector information, based on the movement direction information received from the own mobile body movement direction detection section 11, and outputs the movement vector information. The movement vector information is a result of the movement vector extraction. The movement vector information is danger determination information indicating that the other mobile body 6 is approaching the own mobile body 5. The movement vector extraction process will be described later in detail with reference to FIG. 7.

Figure 17:
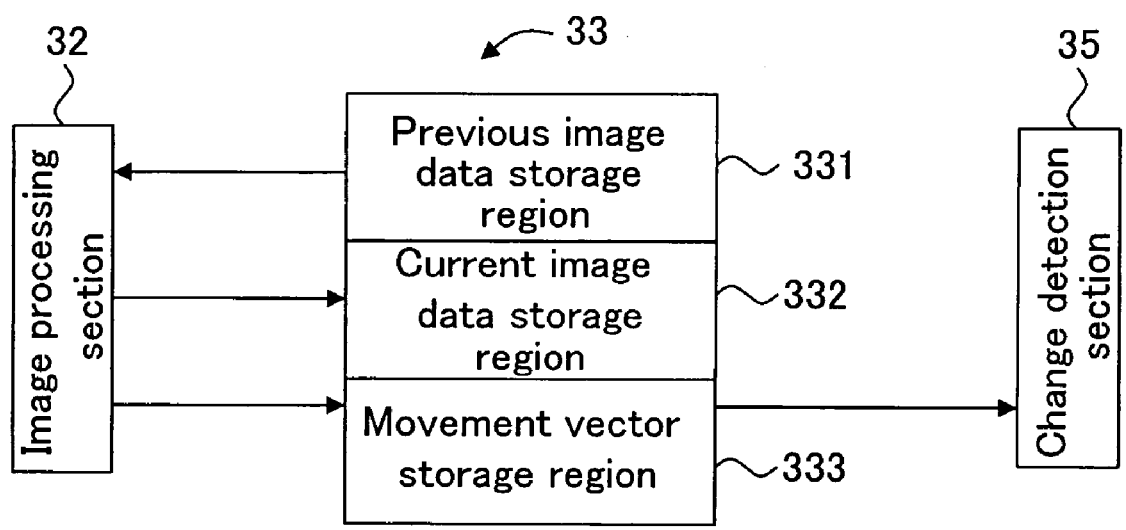
FIG. 17 is a block diagram showing an example of a memory structure of the memory section in FIG. 13.

The storage section 33 temporarily stores a result of the movement vector extraction process by the image processing section 32A. The storage section 33 has the same memory structure as the storage section shown in Japanese Laid-Open Publication No. 2005-222424. Specifically, as shown in FIG. 17, the storage section 33 has a previous image data storage region 331, a current image data storage region 332 and a movement vector storage region 333. Among them, the previous image data storage region 331 and the current image data storage region 332 are switched on a frame-by-frame basis by switching the memory address. The movement vector information extracted using the detection sensitivity adjusted based on the movement direction information from the own mobile body movement direction detection section 11 is supplied to the movement vector storage region 333 from the image processing section 32A, and it is stored in the movement vector storage region 333 as the information indicating whether or not the other mobile body 6 is approaching the own mobile body 5.

The change detection threshold setting section 34 sets a change detection threshold as a danger determination threshold. The anger determination threshold is used to determine whether or not the movement state of the other mobile body 6 relative to the own mobile body 5 is dangerous.

The change detection section 35 detects the other mobile body 6 which is present in the vicinity of the own mobile body 5 based on the movement vector information which is extracted by the image processing section 32 and is stored by the storage section 33. The change detection section 35 further determines whether or not the movement state of the other mobile body 6 relative to the own mobile body 5 (distance relationship between the own mobile body 5 and the other mobile body 6) is dangerous, based on the danger determination threshold set by the change detection threshold setting section 34. When the movement state of the other mobile body 6 relative to the own mobile body 5 (distance relationship between the own mobile body 5 and the other mobile body 6) exceeds the danger determination threshold, the change detection section 35 outputs warning detection information as a result of determination by the change detection section 35 to the change informing section 4.

The change informing section 4 informs a driver of the own mobile body 5 of a danger by generating a warning sound or displaying a warning based on the movement state of the other mobile body 6 relative to the own mobile body 5 which is detected by the change detection section 35, such as, for example, warning detection information which is output when the other mobile body 6 is very close to the own mobile body 5 so that there is a risk of a crash (when the relative movement state exceeds the danger determination threshold).

Hereinafter, a mobile body surrounding surveillance method using the mobile body surrounding surveillance apparatus 1A according to Embodiment 1 of the present invention will be described. It is assumed that the image capturing section 2 is mounted on a mirror portion on the right side of a right steering wheel vehicle. When the own mobile body 5 is moving straight or moving on a curved street with a constant curvature, it is possible to detect the other mobile body 6 which is approaching the own mobile body 5 for determining danger, using the method which is described in detail in Japanese Laid-Open Publication No. 2005-222424 (FIGS. 15 through 18).

However, when the curvature of the curved street changes, such as when the own mobile body 5 is approaching the curved street or coming out of the curved street (when the moving direction of the own mobile body 5 is different from the moving direction of he other mobile body 6), it is necessary to adjust the detection sensitivity by the image processing section 32A based on the movement direction information from the own mobile body direction detection section 11. This adjustment is made in order to improve the accuracy of detection of the other mobile body 6 approaching the own mobile body 5. This is one of the features of the present invention.

Figure 3:
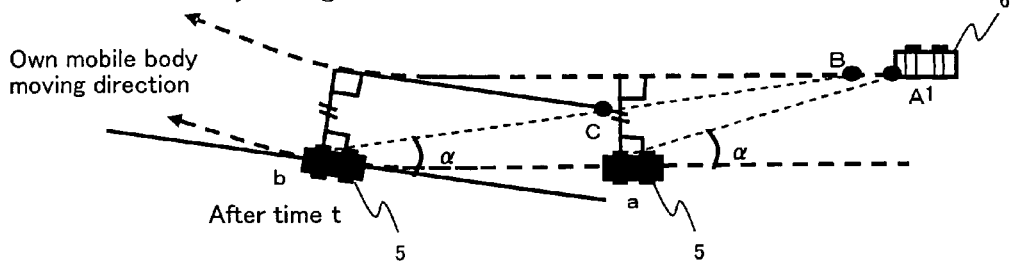
FIG. 3 is a top view schematically showing a case, where the own mobile body which moves along a straight street is approaching a right curved street.

FIG. 3 schematically shows a case where the own mobile body 5 which moves along the straight street is approaching a right curved street. It is assumed that the own mobile body 5 is located at position a at an earlier time t (previous image) and the other mobile body 6 is located at rearward position A1 from the own mobile body 5 at the earlier time t (previous image). The angle between the line passing through the position a and the rearward position A1 and the movement direction of the own mobile body 5 is α. It is also assumed that the own mobile body 5 is located at position b at a later time t (current image). The position where the line passing through the position b and having the angle α with respect to the movement direction of the own mobile body 5 intersects with the movement direction of the other mobile body 6 is B. When the other mobile body 6 has already passed the position B at the later time t (current image), the movement vector of the other mobile body 6 is observed in the left direction from the own mobile body 5. When the other mobile body 6 has passed the position B even a little time t after (current image), the movement vector is observed in the left direction. The distance between a and A1 is equal to the distance between b and C. Thus, even when the other mobile body 6 is obviously moving away from the own mobile body 5, the movement vector may be erroneously detected in the left direction. In this case, it is necessary to weaken the detection sensitivity of the movement vector in the left direction.

Figure 4:
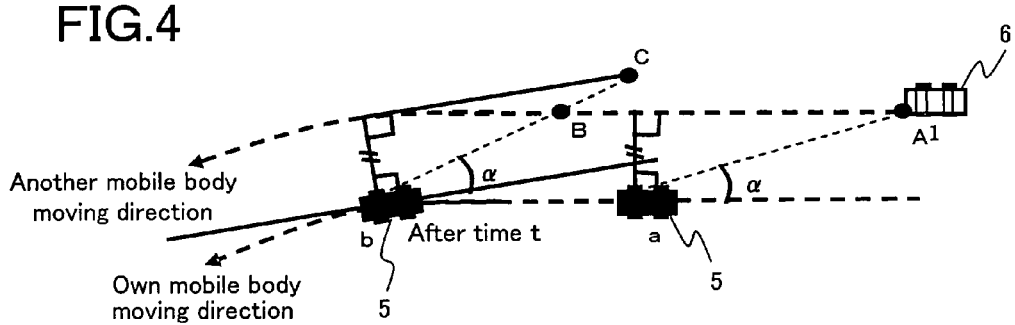
FIG. 4 is a top view schematically showing a case where the own mobile body which moves along a straight street is approaching a left curved street.

FIG. 4 schematically shows a case where the own mobile body 5 which moves along the straight street is approaching a left curved street, in contrast to the case shown in FIG. 3. It is assumed that the own mobile body 5 is located at position a at an earlier time t (previous image) and the other mobile body 6 is located at rearward position A1 from the own mobile body 5 at the earlier time t (previous image). The angle between the line passing through the position a and the rearward position A1 and the movement direction of the own mobile body 5 is α. It is also assumed that the own mobile body 5 is located at position b at a later time t (current image). The position where the line passing through the position b and having the angle α with respect to the movement direction of the own mobile body 5 intersects with the movement direction of the other mobile body 6 is B. When the other mobile body 6 has already passed the position B at the later time t (current image), the movement vector of the other mobile body 6 is observed in the left direction from the own mobile body 5. When the other mobile body 6 has not passed the position B even a little at the later time t (current image), the movement vector is observed in the right direction. The distance between a and A1 is equal to the distance between b and C. Thus, even when the other mobile body 6 is obviously approaching the own mobile body 5, the movement vector may be erroneously detected in the right direction. In this case, it is necessary to strengthen the detection sensitivity of the movement vector in the left direction.

Figure 5:
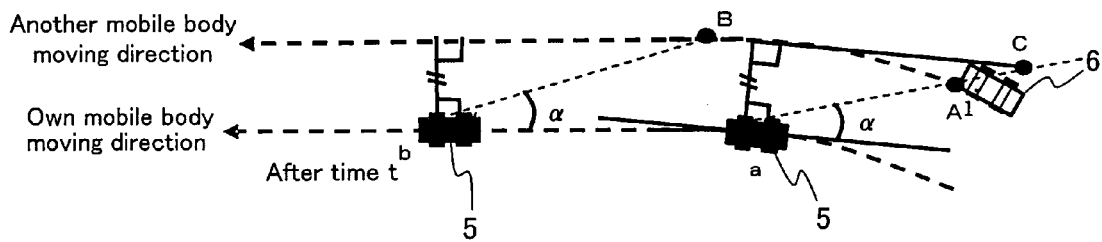
FIG. 5 is a top view schematically showing a case where the own mobile body is coming out of the left curved street and is approaching a straight street.

FIG. 5 schematically shows a case where the own mobile body 5 is coming out of a left curved street. It is assumed that the own mobile body 5 is located at position a at an earlier time t (previous image) and the other mobile body 6 is located at rearward position A1 from the own mobile body 5 at the earlier time t (previous image). The angle between the line passing through the position a and the rearward position A1 and the movement direction of the own mobile body 5 is α. It is also assumed that the own mobile body 5 is located at position b at a later time t (current image). The position where the line passing through the position b and having the angle α with respect to the movement direction of the own mobile body 5 intersects with the movement direction of the other mobile body 6 is B. When the other mobile body 6 has already passed the position B at the later time t (current image), the movement vector of the other mobile body 6 is observed in the left direction from the own mobile body 5. When the other mobile body 6 has passed the position B even a little at the later time t (current image), the movement vector is observed in the left direction. The distance between a and C is equal to the distance between b and B. Thus, even when the other mobile body 6 is obviously moving away from the own mobile body 5, the movement vector may be erroneously detected in the left direction. In this case, it is necessary to weaken the detection sensitivity of the movement vector in the left direction.

Figure 6:
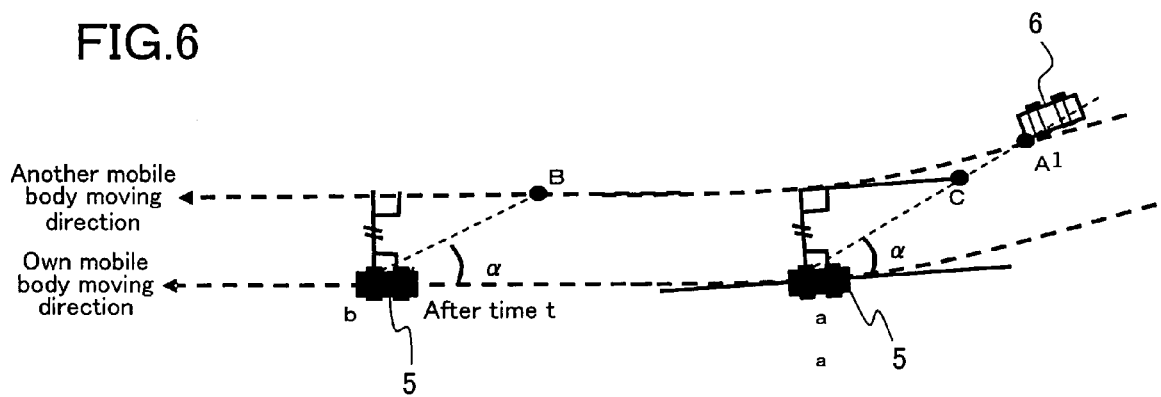
FIG. 6 is a top view schematically showing a case where the own mobile body is coming out of the right curved street and is approaching a straight street.

FIG. 6 schematically shows a case where the own mobile body 5 is coming out of a right curved street. It is assumed that the own mobile body 5 is located at position a at an earlier time t (previous image) and the other mobile body 6 is located at rearward position A1 from the own mobile body 5 at the earlier time t (previous image). The angle between the line passing through the position a and the rearward position A1 and the movement direction of the own mobile body 5 is α. It is also assumed that the own mobile body 5 is located at position b at a later time t (current image). The position where the line passing through the position b and having the angle α with respect to the movement direction of the own mobile body 5 intersects with the movement direction of the other mobile body 6 is B. When the other mobile body 6 has already passed the position B at the later time t (current image), the movement vector of the other mobile body 6 is observed in the left direction from the own mobile body 5. When the other mobile body 6 has not passed the position B even a little at the later time t (current image), the movement vector is observed in the right direction. The distance between a and C is equal to the distance between b and B. Thus, even when the other mobile body 6 is obviously approaching the own mobile body 5, the movement vector may be erroneously detected in the right direction. In this case, it is necessary to strengthen the detection sensitivity of the movement vector in the left direction.

As described above, when the curvature of the curved street changes, such as when the own mobile body 5 is approaching the curved street or coming out of the curved street (when the moving direction of the own mobile body 5 is different from the moving direction of he other mobile body 6), it is necessary to adjust the detection sensitivity in order to improve the accuracy of detection of the other mobile body 6 approaching the own mobile body 5. In Embodiment 1 of the present invention, the sensitivity for detecting the movement vector is adjusted based on the movement direction of the own mobile body 5.

Figure 7:
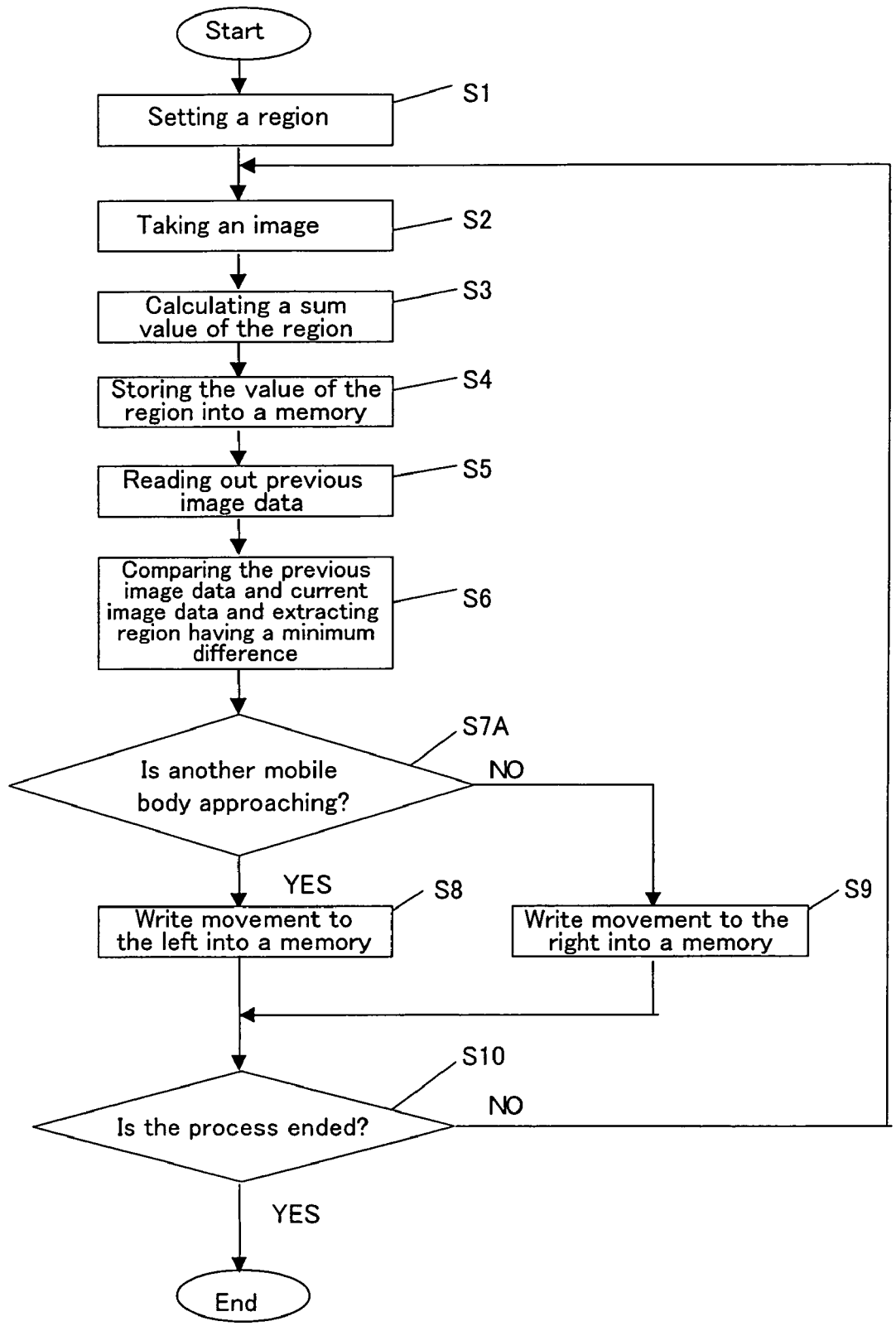
FIG. 7 is a flowchart for explaining the processing of extracting a movement vector information and another mobile body information by the image processing section in FIG. 1.
Figure 16:
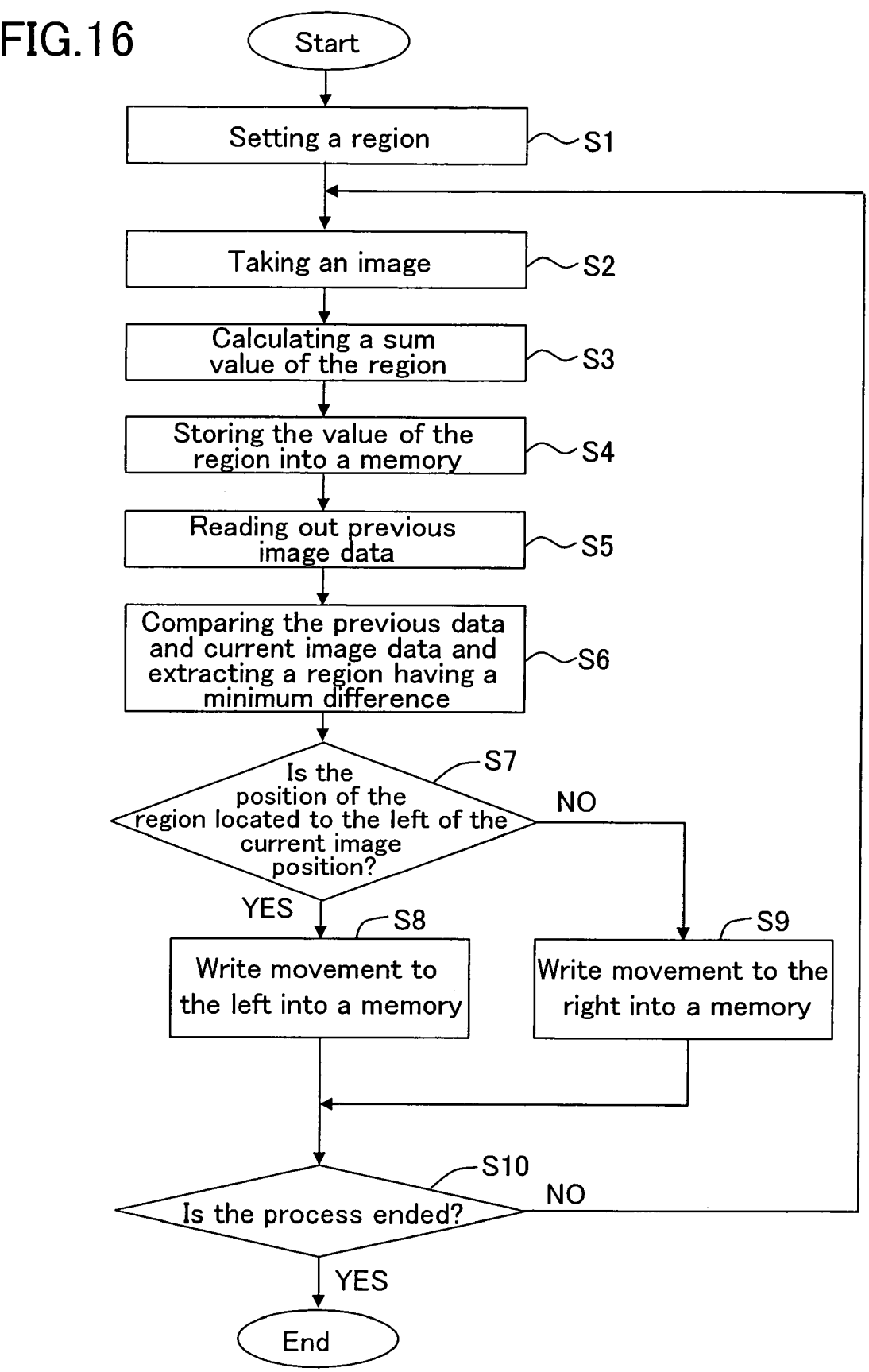
FIG. 16 is a flowchart for explaining the processing example of extracting the movement vector information by the image processing section shown in FIG. 13.

FIG. 7 is a flowchart for explaining the processing of extracting a movement vector information and another mobile body information by the image processing section 32A in FIG. 1 according to Embodiment 1 of the present invention. Since the only difference between FIG. 7 and FIG. 16 is the processing in step S7A, only step S7A will be described herein.

As shown in FIG. 7, in step S7A, it is determined whether or not the other mobile body 6 is approaching the own mobile body 5 based on (i) the positional relationship between the divided region of the previous image data extracted in step S6 and the divided region of the current image data and (ii) the movement direction information of the own mobile body 5 received from the own mobile body movement direction detection section 11. When it is determined that the other mobile body 6 is approaching the own mobile body 5 ("YES" in step S7A), the process proceeds to step S8. When it is determined that the other mobile body 6 is not approaching (moving away from) the own mobile body 5, the process proceeds to step S9 ("NO" in step S7A).

Figure 8:
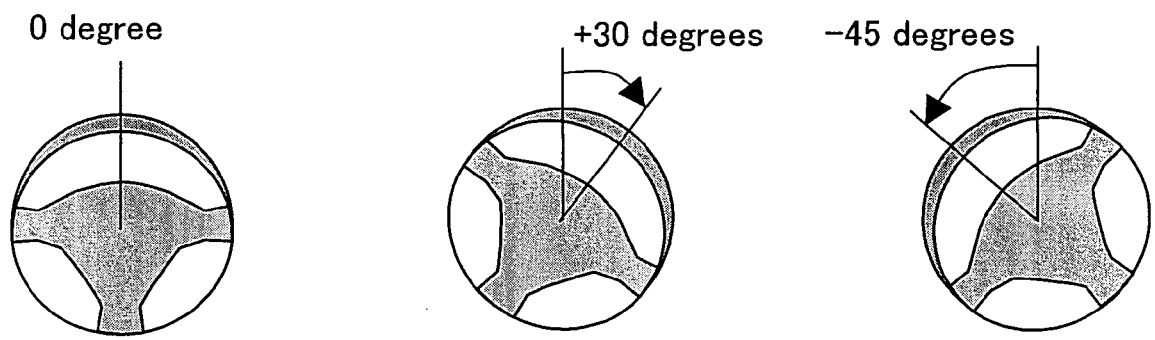
FIG. 8 is a diagram for explaining the definition of a steering angle information.

When the mobile body is an automobile, the movement direction information of the own mobile body 5 detected by the own mobile body movement detection section 11 can be obtained, for example, as a steering angle information (steering wheel angle of the own mobile body 5) as shown in FIG. 8. The steering angle is defined, for example, as an angle in a positive direction when the steering wheel is steered to the right and as an angle in a negative direction when the steering wheel is steered to the left.

Figure 9:
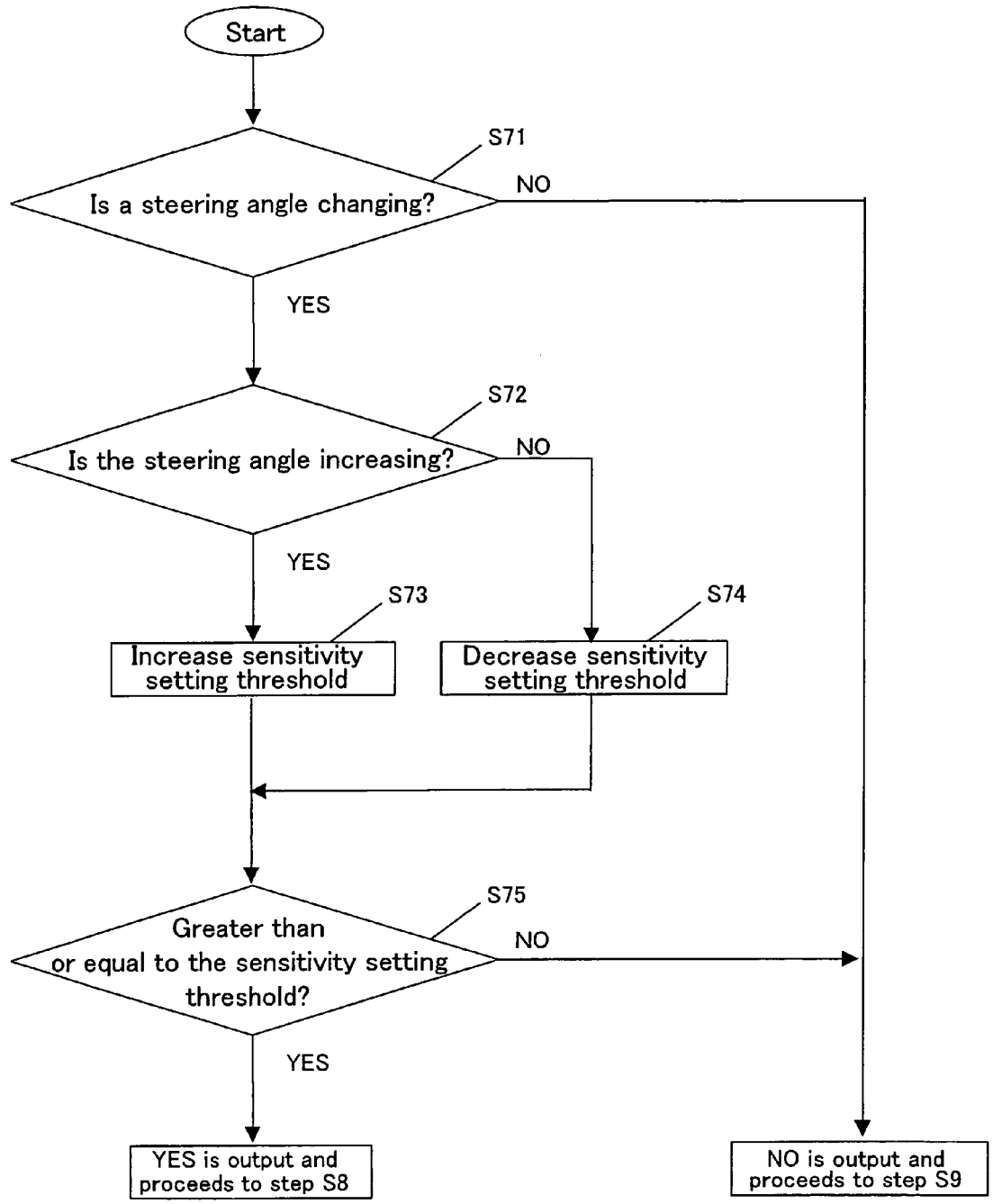
FIG. 9 is a flowchart for explaining the processing in step S7A shown in FIG. 7.

FIG. 9 is a flowchart for explaining the processing of detecting whether or not the other mobile body 6 is approaching the own mobile body 5 in step S7A in FIG. 7.

As shown in FIG. 9, in step S71, it is determined whether or not the steering angle of the steering wheel of the own mobile body is changing, based on the movement direction information received from the own mobile body movement direction detection section 11. When the steering angle is changing ("YES" in step S71), the process proceeds to step S72. When the steering angle is constant ("NO" in step S71), the process proceeds to step S9 in FIG. 7 through "NO" branch output of step S7A in FIG. 7.

In step S72, it is determined whether or not the steering angle of the steering wheel of the own mobile body 5 is increasing. When the steering angle is increasing ("YES" in step S72), the process proceeds to step S73. When the steering angle is decreasing ("NO" in step S72), the process proceeds to step S74. The case where the steering angle is increasing corresponds to the case where the steering wheel is steered to the right as shown in FIGS. 3 and 5. As shown in FIG. 8, the right direction is a positive direction. The case where the steering angle is decreasing corresponds to the case where the steering wheel is steered to the left as shown in FIGS. 4 and 6. As shown in FIG. 8, the left direction is a negative direction.

In step S73, the sensitivity setting threshold is increased so as to weaken the detection sensitivity of the movement vector. The sensitivity setting threshold is used to determine whether or not the other mobile body 6 is approaching the own mobile body 5 based on the movement amount of the movement vector.

In step S74, the sensitivity setting threshold is decreased so as to strengthen the detection sensitivity of the movement vector. The sensitivity setting threshold is used to determine whether or not the other mobile body 6 is approaching the own mobile body 5 based on the movement amount of the movement vector.

In step S75, the movement amount of the movement vector is compared with the sensitivity setting threshold to determine whether or not the movement amount of the movement vector is greater than or equal to the sensitivity setting threshold. When the movement amount of the movement vector is greater than or equal to the sensitivity setting threshold ("YES" in step S75), the process proceeds to step S8 in FIG. 7 through "YES" branch output of step S7A in FIG. 7. When the movement amount of the movement vector is less than the sensitivity setting threshold ("NO" in step S75), the process proceeds to step S9 in FIG. 7 through "NO" branch output of step S7A in FIG. 7.

Figure 18:
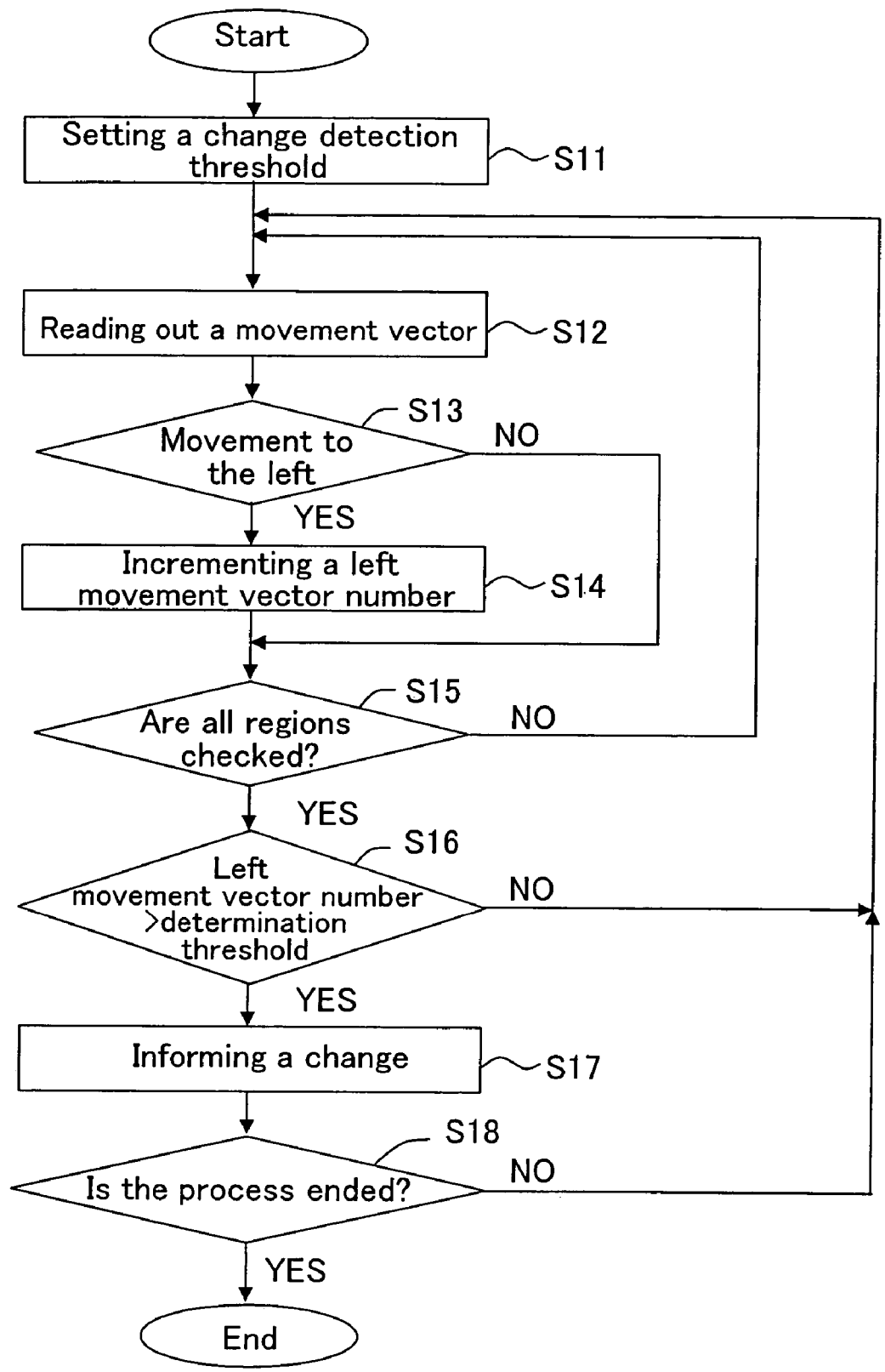
FIG. 18 is a flowchart for explaining a processing example of detecting a moving state of the other mobile body relative to the own mobile body by the change detection section shown in FIG. 13.
Figure 19:
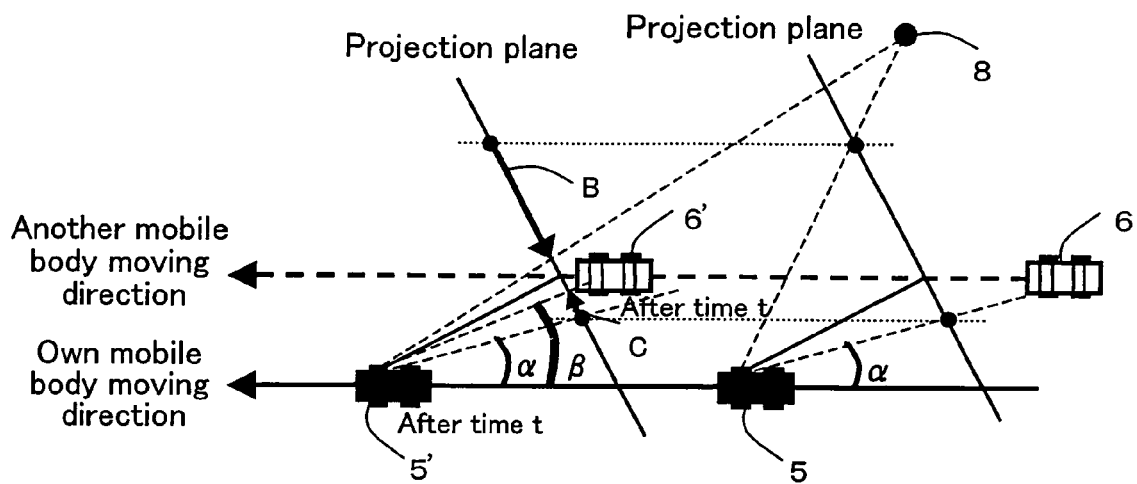
FIG. 19 is a diagram viewed from the top of the image diagram shown in FIG. 15 in the case where the own mobile body and the other mobile body are moving straight.
Figure 20:
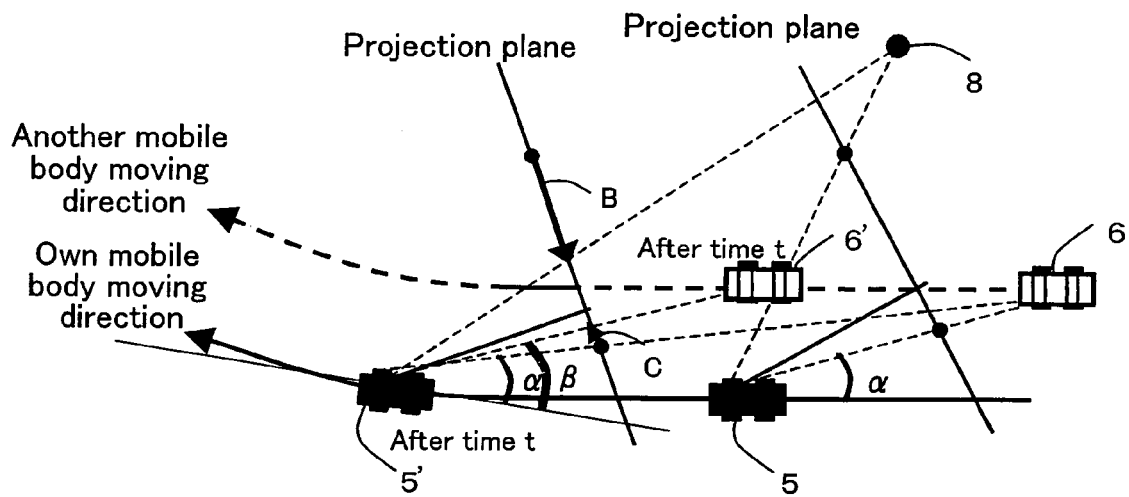
FIG. 20 is a diagram viewed from the top of the image diagram shown in FIG. 15 in the case where the own mobile body is approaching a right curved street.

By using the information indicating whether or not the other mobile body 6 is approaching the own mobile body 5 detected in this manner (i.e., the movement vector detected by using the sensitivity setting threshold which has been adjusted based on the movement direction information from the own mobile body movement direction detection section 11), the processing of detecting the moving state of the other mobile body 6 relative to the own mobile body 5 is performed by the change detection section 35 for determining the danger as in the case of the flowchart of FIG. 18.

In "movement vector is read" of step S12 in FIG. 18, the movement vector information written in the movement vector storage region 333 of the storage section 33 is read to the change detection section 35 by the image processing section 32A. However, in Embodiment 1 of the present invention, the movement vector detected using the sensitivity setting threshold which has been adjusted as the mobile body approaching information is stored in the movement vector storage region 333. In steps S13 to S16 in FIG. 18, the processing of detecting the moving state of the other mobile body 6 relative to the own mobile body 5 is performed for determining the danger.

In this manner, the present invention can detect the other mobile body 6 which is present in the surrounding of the own mobile body 5 more accurately and positively than the conventional method. When there is a risk of collision or crash, a warning can be issued to such as a driver. As a result, the driver can avoid the danger in advance.

As described above, according to Embodiment 1 of the present invention, it is possible to detect the other mobile body 6 which is present in the surrounding of the own mobile body with high precision in real time (at a high speed) without requiring a large amount of a advanced computation. As a result, it is possible to inform a driver and the like of a danger when there is a risk of collision or crash.

Embodiment 2

In Embodiment 1 of the present invention, the processing of determining danger, when the image capturing section 2 is mounted on the mirror portion on the right side of the right steering wheel vehicle, has been described. In Embodiment 2 of the present invention, the processing of determining danger, when the image capturing section 2 is mounted on the mirror portion on the left side of the right steering wheel vehicle, will be described. When the image capturing section 2 is mounted on the own mobile body 5 in this manner, the movement vector in the right direction indicates that the other mobile body 6 is approaching the own mobile body 5. Thus, (i) an adjustment of sensitivity for detecting a movement vector in the processing of extracting the other mobile body approaching information and (ii) a sum of vector number of the movement amount in the processing of detecting the moving state of the other mobile body 6 relative to the own mobile body 5 are performed on a movement vector information in the right direction. The processing of determining danger, when the image capturing section 2 is mounted on the mirror portion on the left side of the right steering wheel vehicle, will be described with reference to FIGS. 10 and 11.

Figure 10:
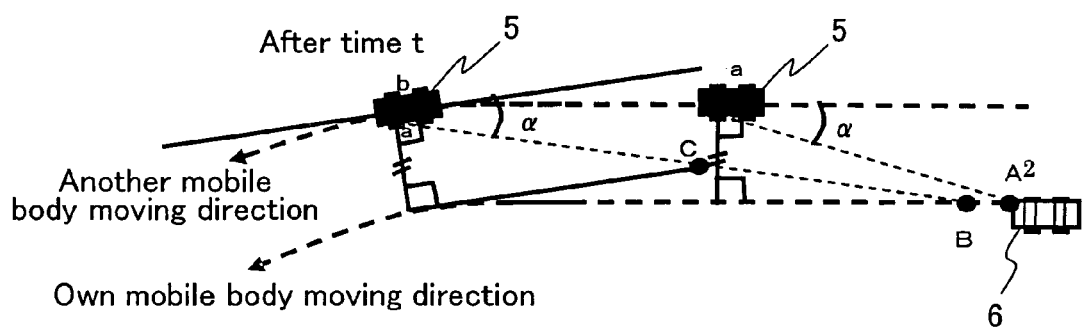
FIG. 10 is a top view showing a case where the own mobile body which moves along a straight street is approaching a left curved street, when the image capturing section is mounted on the left-side mirror of the own mobile body according to Embodiment 2.

FIG. 10 is a top view showing a state in which the own mobile body 5 which is moves along the straight street is approaching a left curved street, when the image capturing section 2 is mounted on the left-side mirror of the own mobile body 5 according to Embodiment 2 of the present invention.

As shown in FIG. 10, it is assumed that the own mobile body 5 is located at position a at an earlier time t (previous image) and the other mobile body 6 is located at rearward position A2 from the own mobile body 5 at the earlier time t (previous image). The angle between the line passing through the position a and the rearward position A1 and the movement direction of the own mobile body 5 is $\alpha$. It is also assumed that the own mobile body 5 is located at position b at a later time t (current image). The position where the line passing through the position b and having the angle α with respect to the movement direction of the own mobile body 5 intersects with the movement direction of the other mobile body 6 is B. When the other mobile body 6 has already passed the position B at the later time t (current image), the movement vector of the other mobile body 6 is observed in the right direction from the own mobile body 5. When the other mobile body 6 has passed the position B even a little at the later time t (current image), the movement vector is observed in the right direction. The distance between a and A2 is equal to the distance between b and C. Thus, even when the other mobile body 6 is obviously moving away from the own mobile body 5, the movement vector may be erroneously detected in the right direction. In this case, it is necessary to weaken the detection sensitivity of the movement vector in the right direction.

In a similar manner, in the case where the image capturing section 2 is mounted on the left side of the own mobile body 5, when the own mobile body 5 which moves along the straight street is approaching a right curved street, it is necessary to strengthen the sensitivity for detecting a movement vector in the right direction. Also, when the own mobile body 5 is coming out of a left curved street, it is necessary to strengthen the sensitivity for detecting a movement vector in the right direction. Furthermore, when the own mobile body 5 is coming out of the right curved street, it is necessary to weaken the sensitivity for detecting a movement vector in the right direction.

Figure 11:
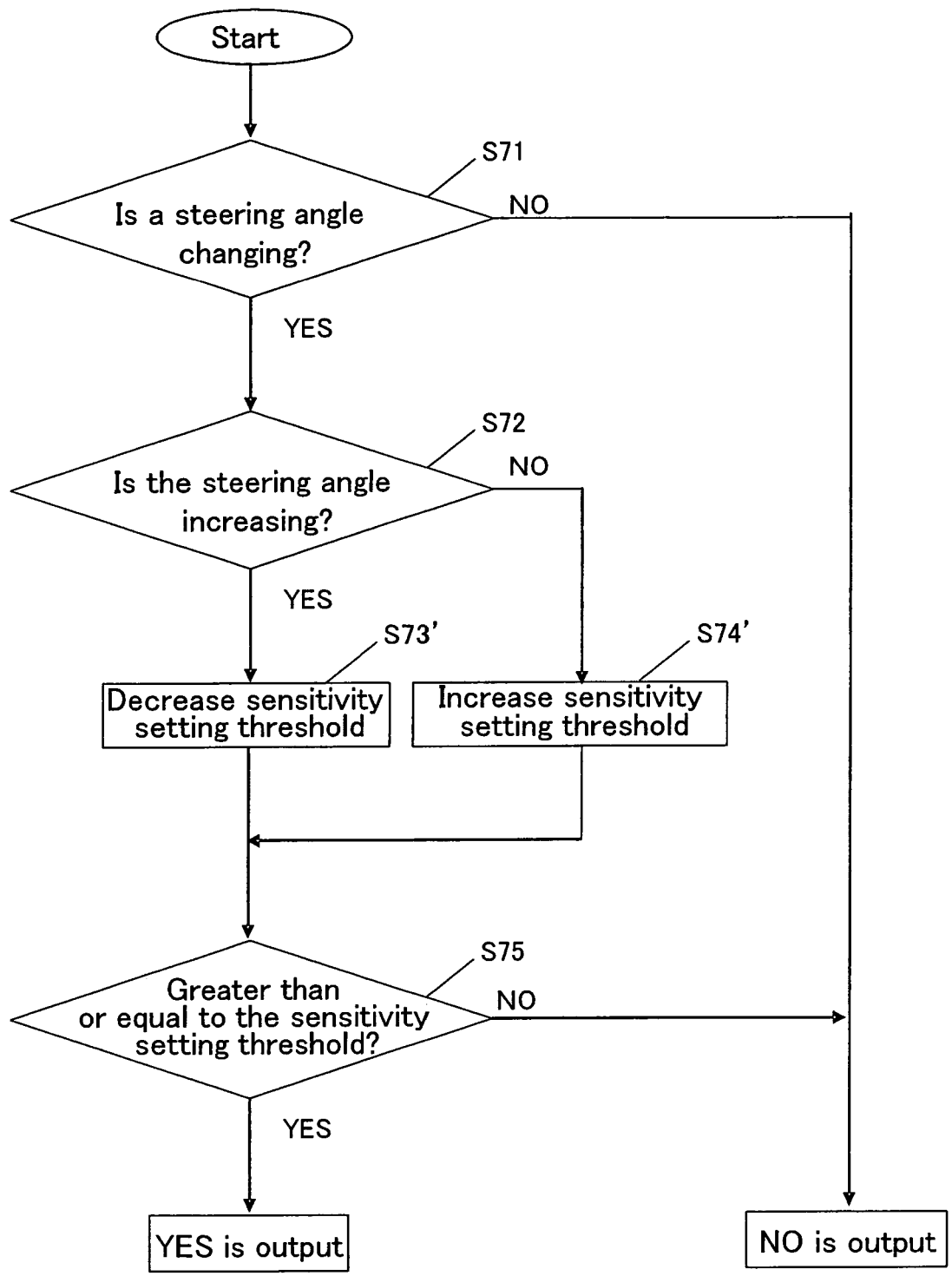
FIG. 11 is a flowchart for explaining the processing in step S7A in FIG. 7, when the image capturing section is mounted on the left side of the own mobile body according to Embodiment 2.
Figure 12:
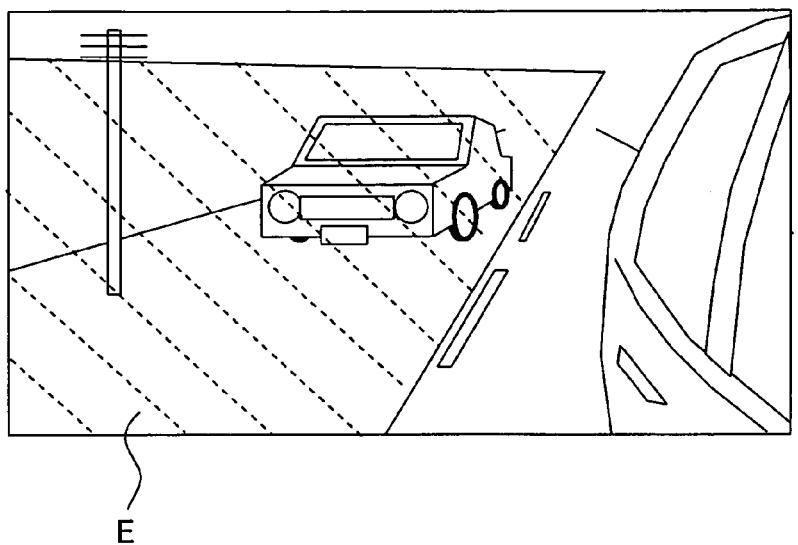
FIG. 12 is an image diagram schematically showing a conventional detection region in the prior art (reference 1).

FIG. 11 is a flowchart for explaining the processing of step S7A in FIG. 7, when the image capturing section 2 is mounted on the left side of the own mobile body 5 according to Embodiment 2 of the present invention. In a similar manner as described above, a steering angle information is defined as an angle in a positive direction when the steering wheel is steered to the right and is defined as an angle in a negative direction when the steering wheel is steered to the left. FIG. 11 is the same as FIG. 9 except that steps S73' and S74' in FIG. 11 are different from steps S73 and S74 in FIG. 9.

As shown in FIG. 11, in step S71, it is determined whether or not the steering angle of the steering wheel of the own mobile body 5 is changing, based on the movement direction information received from the own mobile body movement direction detection section 11. When the steering angle is changing ("YES" in step S71), the process proceeds to step S72. When the steering angle is constant ("NO" in step S71), the process proceeds to step S9 in FIG. 7 through "NO" branch output of step S7A in FIG. 7.

In step S72, it is determined whether or not the steering angle of the steering wheel of the own mobile body 5 is increasing. When the steering angle is increasing ("YES" in step S72), the process proceeds to step S73'. When the steering angle is decreasing ("NO" in step S72), the process proceeds to step S74'. The case where the steering angle is increasing corresponds to the case where the steering wheel is steered to the right as shown in FIGS. 3 and 5. As shown in FIG. 8, the right direction is a positive direction. The case where the steering angle is decreasing corresponds to the case where the steering wheel is steered to the left as shown in FIGS. 4 and 6. As shown in FIG. 8, the left direction is a negative direction.

In step S73', the sensitivity setting threshold is decreased so as to strengthen the detection sensitivity of the movement vector. The sensitivity setting threshold is used to determine whether or not the other mobile body 6 is approaching the own mobile body 5 based on the movement amount of the movement vector.

In step S74', the sensitivity setting threshold is increased so as to weaken the detection sensitivity of the movement vector. The sensitivity setting threshold is used to determine whether or not the other mobile body 6 is approaching the own mobile body 5 based on the movement amount of the movement vector.

In step S75, the movement amount of the movement vector is compared with the sensitivity setting threshold to determine whether or not the movement amount of the movement vector is greater than or equal to the sensitivity setting threshold. When the movement amount of the movement vector is greater than or equal to the sensitivity setting threshold ("YES" in step S75), the process proceeds to step S8 in FIG. 7 through "YES" branch output of step S7A in FIG. 7. When the movement amount of the movement vector is less than the sensitivity setting threshold ("NO" in step S75), the process proceeds to step S9 in FIG. 7 through "NO" branch output of step S7A in FIG. 7.

By using the information indicating whether or not the other mobile body 6 is approaching the own mobile body 5 detected in this manner (i.e., the movement vector detected by using the sensitivity setting threshold which has been adjusted based on the movement direction information from the own mobile body movement direction detection section 11), the processing of detecting the moving state of the other mobile body 6 relative to the own mobile body 5 is performed by the change detection section 35 for determining the danger as in the case of the flowchart of FIG. 18. However, since the image capturing section 2 is mounted on the left side of the own mobile body 5, the vector number of the movement amount in the right direction is calculated in step S15. When the number of movement vector (sum value) in the right direction calculated in step S16 is greater than the threshold set in step S11, it is determined that there exists the other mobile body 6 which is approaching the own mobile body 5.

In Embodiment 1 of the present invention, the processing of determining danger, when the image capturing section 2 is mounted on the mirror portion on the right side of the right steering wheel vehicle, has been described. In Embodiment 2 of the present invention, the processing of determining danger, when the image capturing section 2 is mounted on the mirror portion on the left side of the right steering wheel vehicle, has been described. However, the present invention is not limited to both cases. The image capturing sections 2 can be mounted on the side mirrors or the door mirrors on both sides (i.e., a side of a driver's seat and a side opposite to the driver's seat), respectively. In summary, it is possible to mount the image capturing section 2 on the side mirror or the door mirror of on at least one side of the side of a driver's seat and the side opposite to the driver's seat.

In the case of the right steering wheel vehicle, by mounting the image capturing section 2 on the left side mirror portion, it is possible to obtain an effect that only one image capturing section 2 can capture an image of the blind spot. Also, in the case of the left steering wheel vehicle, by mounting the image capturing section 2 on the right side mirror portion, it is possible to obtain an effect that only one image capturing section 2 can capture an image of the blind spot. Furthermore, by mounting the respective image capturing sections 2 on the left and right mirror portions, in either case of the left or right steering wheel vehicle, it is possible obtain an effect that the image capturing section 2 can capture an image of the blind spot.

Though not described in the above-described Embodiments 1 and 2, the present invention can be constructed by software other than hardware. In this case, the computation section 3A of FIG. 1 is accommodated in a controller which controls the whole apparatus (control section having a CPU). A control program and its data for causing a computer to execute the steps of the flowcharts are stored in a storage device, such as a hard disk (computer-readable recording medium) in the controller or the like. The control program and its data can be read out from the storage to a work memory in the controller and can be executed.

Examples of the computer-readable recording medium include various IC memories, optical discs (e.g., CD, DVD, etc.), magnetic recording media (e.g., FD, etc.) and the like in addition to a hard disk. The control program and its data thus read out are stored in a RAM (work memory) in the controller and are executed by the CPU (control section) in the controller.

The CPU (control section) in such a controller performs, based on the control program within the aforementioned computer-readable recording medium (ROM or RAM): an image capturing step (section) of capturing an image data in a surrounding of an own mobile body 5 as a frame image, the image data being captured by an image capturing section 2 in time series; a setting step (section) of setting a particular region which is parallel to the horizontal direction of the frame image and rectangular having a long edge in the horizontal direction for each of one or a plurality of captured frame images; an own mobile body movement direction detection step (section) of detecting a movement direction of the own mobile body 5 and outputting a movement direction information indicating the detected movement direction; a movement vector information extraction step (section) of taking the image data of the particular region for each of one or the plurality of the captured frame images and extracting a movement vector information on another mobile body 6 based on the image data of the particular region and the movement direction information; and a change detection step (section) of detecting a moving state of the other mobile body 6 which is present in the surrounding of the own mobile body 5 based on the movement vector information.

In this case, the movement vector information extraction step (section) includes: a dividing step (section) of dividing image data of the particular region which is a portion of image data of the captured image data into a plurality of divided regions; a sum value calculating step (section) of calculating a sum of the image data values for each divided region; a divided region extraction step (section) of extracting one of the divided regions of previous image data having a minimum difference in sum value between the previous image data and current image data, for each divided region of the current image data; a left/right determination step (section) of determining whether the divided region of the current image data which gives the minimum difference is located to the left or right with respect to the extracted divided region of the previous image data; and a movement vector information determination step (section) of determining a direction information of the movement vector information as left movement vector information when the divided region of the current image data is located to the "left" and as right movement vector information when the divided region of the current image data is located to the "right".

Furthermore, when the own mobile body 5 is a vehicle, the left/right determination step (section) in Embodiment 1 according to the present invention includes: an operation angle increasing determination step (section) of determining whether or not the operation angle of a steering wheel of the own mobile body 5 is increasing; a detection sensitivity control step (section) of, when the operation angle is increasing, increasing a sensitivity setting threshold used to determine whether or not the other mobile body 6 is approaching the own mobile body based on the movement amount of the movement vector information so as to weaken the detection sensitivity for the movement vector information and, when the operation angle is not increasing, maintaining or decreasing the sensitivity setting threshold so as to maintain or strengthen the detection sensitivity for the movement vector information; and a comparison and determination step (section) of comparing the movement amount of the movement vector information with the sensitivity setting threshold and determines whether or not the movement amount of the movement vector information is greater than or equal to the sensitivity setting threshold so as to determine whether the divided region of the current image data which gives the minimum difference is located to the "left" or "right".

When the own mobile body 5 is a vehicle, the left/right determination step (section) in Embodiment 2 according to the present invention includes: an operation angle increasing determination step (section) of determining whether or not the operation angle of a steering wheel of the own mobile body 5 is increasing; a detection sensitivity control step (section) of, when the operation angle is increasing, decreasing a sensitivity setting threshold used to determine whether or not the other mobile body 6 is approaching the own mobile body based on the movement amount of the movement vector information so as to strengthen the detection sensitivity for the movement vector information and, when the operation angle is not increasing, maintaining or increasing the sensitivity setting threshold so as to maintain or weaken the detection sensitivity for the movement vector information; and a comparison and determination step (section) of comparing the movement amount of the movement vector information with the sensitivity setting threshold and determines whether or not the movement amount of the movement vector information is greater than or equal to the sensitivity setting threshold so as to determine whether the divided region of the current image data which gives the minimum difference is located to the "left" or "right".

As described above, the present invention is exemplified by the use of its preferred embodiments. However, the present invention should not be interpreted solely based on the embodiments described above. It is understood that the scope of the present invention should be interpreted solely based on the claims. It is also understood that those skilled in the art can implement equivalent scope of technology, based on the description of the present invention and common knowledge from the description of the detailed preferred embodiments of the present invention. Furthermore, it is understood that any patent, any patent application and any references cited in the present specification should be incorporated by reference in the present specification in the same manner as the contents are specifically described therein.

INDUSTRIAL APPLICABILITY

As described above, the present invention provides a mobile body surrounding surveillance apparatus for surveillance of safety during movement of a manned or unmanned mobile body, such as a ship or a car (a vehicle, such as a two-wheeled vehicle (e.g., a motorcycle or a bicycle), a four-wheeled vehicle (e.g., an automobile), a train, etc.), a human or the like. For example, when a mobile body (own mobile body 5) moves laterally and there is a risk such that the mobile body contacts or collides with another mobile body (another mobile body 6) existing therearound, the mobile body surrounding surveillance apparatus is used to assist confirming the safety by warning a human involved with the mobile body by informing the danger caused by the approach of the other mobile body. The present invention also relates to a mobile body surrounding surveillance method using the mobile body surrounding surveillance apparatus, a control program for causing a computer to execute the mobile body surrounding surveillance method, and a computer-readable recording medium recording the control program. According to the present invention, the other mobile body present in the vicinity of the own mobile body can be accurately detected in real time (with high speed) without advanced computation or a large computation amount to inform a driver of a risk of collision, crash or the like. Therefore, the present invention is widely useful for a car safety system, a traffic system or the like and can prevent traffic accidents, such as a crash and the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A mobile body surrounding surveillance apparatus comprising:
    an image capturing section for capturing an image in a surrounding of an own mobile body;
    a particular region setting section for setting a particular region for image data captured by the image capturing section, the particular region being parallel to the horizontal direction of a frame image and rectangular having a long edge in the horizontal direction;
    an own mobile body movement direction detection section for detecting a movement direction of the own mobile body and outputting a movement direction information indicating the detected movement direction;
    a movement vector information extraction section for taking the image data of the particular region for each of one or a plurality of frame images captured by the image capturing section in time series and adjusting a detection sensitivity based on the movement direction information so as to extract a movement vector information on another mobile body; and
    a change detection section for detecting a moving state of the other mobile body which is present in the surrounding of the own mobile body based on the movement vector information.

2. A mobile body surrounding surveillance apparatus according to claim 1, wherein the image capturing section is mounted on a position of the own mobile body such that the image capturing section can capture an image in a rear and side direction.

3. A mobile body surrounding surveillance apparatus according to claim 2, wherein the own mobile body is a vehicle, and the image capturing section is mounted on a side mirror or a door mirror of at least one of a side of a driver's seat and a side opposite to the driver's seat.

4. A mobile body surrounding surveillance apparatus according to claim 1, wherein the particular region setting section sets the particular region for the captured image data such that a captured image of the own mobile body is not included in the image data and at least a portion of a captured image of the other mobile body is included in the image data.

5. A mobile body surrounding surveillance apparatus according to claim 1, wherein the own mobile body movement direction detection section detects the movement direction of the own mobile body in accordance with an operation direction when a moving direction control section of the own mobile body is operated.

6. A mobile body surrounding surveillance apparatus according to claim 5, wherein the moving direction control section is a steering wheel, an operation angle information of the steering wheel increases or decreases in accordance with an operation angle in a positive direction or a negative direction, the positive direction being defined as a direction when the steering wheel is steered to the right and the negative direction is defined as a direction when the steering wheel is steered to the left.

7. A mobile body surrounding surveillance apparatus according to claim 1, wherein the movement vector information includes a movement amount and direction information indicating a moving state of the other mobile body which is present in the surrounding of the own mobile body.

8. A mobile body surrounding surveillance apparatus according to claim 1, wherein the movement vector information extraction section compares a sum value of a current image data and a sum value of a previous image data time t(t>0) before for each of a plurality of divided regions of the particular region, respectively; extracts divided regions between which the difference of the sum values is minimum; determines a position of the extracted divided region of the previous image data as a position of the divided region of the current image data time t before; and extracts a positional relationship between the extracted divided region of the previous image data and the extracted divided region of the current image data as the movement amount of the movement vector information and extracts the direction information of the movement vector information based on the movement direction information.

9. A mobile body surrounding surveillance apparatus according to claim 8, wherein the movement vector information extraction section determines whether the divided region of the current image data is shifted to the left or right with respect to the divided region of the previous image data based on the positional relationship between the extracted divided regions; increases or decreases a sensitivity setting threshold which is used to extract the direction information of the movement vector information in accordance with the movement direction information; compares the movement amount of the movement vector information and the sensitivity setting threshold; and extracts the direction information of the movement vector information which indicates that the other mobile body is approaching the own mobile body, when the movement amount of the movement vector information is greater than or equal to the sensitivity setting threshold.

10. A mobile body surrounding surveillance apparatus according to claim 7, wherein the movement vector information extraction section includes:
    a dividing section for dividing image data of the particular region which is a portion of image data of the captured image data into a plurality of divided regions;
    a sum value calculating section for calculating a sum of the image data values for each divided region;
    a divided region extraction section for extracting one of the divided regions of previous image data having a minimum difference in sum value between the previous image data and current image data, for each divided region of the current image data;

a left/right determination section for determining whether the divided region of the current image data which gives the minimum difference is located to the left or right with respect to the extracted divided region of the previous image data; and a movement vector information determination section for determining a direction information of the movement vector information as left movement vector information when the divided region of the current image data is located to the left and as right movement vector information when the divided region of the current image data is located to the right.

11. A mobile body surrounding surveillance apparatus according to claim 10, wherein the own mobile body is a vehicle, and the left/right determination section includes:

an operation angle increasing determination section for determining whether or not the operation angle of a steering wheel of the own mobile body is increasing;

a detection sensitivity control section for, when the operation angle is increasing, increasing a sensitivity setting threshold used to determine whether or not the other mobile body is approaching the own mobile body based on the movement amount of the movement vector information so as to weaken the detection sensitivity for the movement vector information and, when the operation angle is not increasing, maintaining or decreasing the sensitivity setting threshold so as to maintain or strengthen the detection sensitivity for the movement vector information; and a comparison and determination section for comparing the movement amount of the movement vector information with the sensitivity setting threshold and determines whether or not the movement amount of the movement vector information is greater than or equal to the sensitivity setting threshold so as to determine whether the divided region of the current image data which gives the minimum difference is located to the left or right.

12. A mobile body surrounding surveillance apparatus according to claim 10, wherein the own mobile body is a vehicle, and the left/right determination section includes:

an operation angle increasing determination section for determining whether or not the operation angle of a steering wheel of the own mobile body is increasing;

a detection sensitivity control section for, when the operation angle is increasing, decreasing a sensitivity setting threshold used to determine whether or not the other mobile body is approaching the own mobile body based on the movement amount of the movement vector information so as to strengthen the detection sensitivity for the movement vector information and, when the operation angle is not increasing, maintaining or increasing the sensitivity setting threshold so as to maintain or weaken the detection sensitivity for the movement vector information; and a comparison and determination section for comparing the movement amount of the movement vector information with the sensitivity setting threshold and determines whether or not the movement amount of the movement vector information is greater than or equal to the sensitivity setting threshold so as to determine whether the divided region of the current image data which gives the minimum difference is located to the left or right.

13. A mobile body surrounding surveillance apparatus according to claim 1, wherein the change detection section detects a moving state of the other mobile body relative to the own mobile body based on the movement vector information.

14. A mobile body surrounding surveillance apparatus according to claim 1, wherein the change detection section reads the movement vector information for each of the plurality of divided regions of the particular region; and detects that there exists the other mobile body which is dangerously approaching the own mobile body when the sum value of the number of the vector movement amounts of a predetermined direction information among the read movement vector information is greater than a predetermined determination threshold.

15. A mobile body surrounding surveillance apparatus according to claim 14, wherein the change detection section calculates, as the direction information, the number of vector in the left direction when the image capturing section is mounted on the right side of the own mobile body and calculates, as the direction information, the number of vector in the right direction when the image capturing section is mounted on the left side of the own mobile body.

16. A mobile body surrounding surveillance apparatus according to claim 1, further comprising a change informing section for outputting a warning in accordance with the moving state of the other mobile body relative to the own mobile body, the moving state being detected by the change detection section.

17. A mobile body surrounding surveillance apparatus according to claim 1, further comprising a storage section for temporarily storing a result extracted by the movement vector information extraction section, wherein the change detection section reads the result extracted by the movement vector information extraction section from the storage section for processing the change detection.

18. A mobile body surrounding surveillance method comprising:

an image capturing step of capturing an image data in a surrounding of an own mobile body as a frame image, the image data being captured by an image capturing section in time series;

a setting step of setting a particular region which is parallel to the horizontal direction of the frame image and rectangular having a long edge in the horizontal direction for each of one or a plurality of captured frame images;

an own mobile body movement direction detection step of detecting a movement direction of the own mobile body and outputting a movement direction information indicating the detected movement direction;

a movement vector information extraction step of taking the image data of the particular region for each of one or the plurality of the captured frame images and extracting a movement vector information on another mobile body based on the image data of the particular region and the movement direction information; and a change detection step of detecting a moving state of the other mobile body which is present in the surrounding of the own mobile body based on the movement vector information.

19. A mobile body surrounding surveillance method according to claim 18, wherein the movement vector information extraction step includes:

a dividing step of dividing image data of the particular region which is a portion of image data of the captured image data into a plurality of divided regions;

a sum value calculating step of calculating a sum of the image data values for each divided region;

a divided region extraction step of extracting one of the divided regions of previous image data having a minimum difference in sum value between the previous image data and current image data, for each divided region of the current image data;

a left/right determination step of determining whether the divided region of the current image data which gives the minimum difference is located to the left or right with respect to the extracted divided region of the previous image data; and a movement vector information determination step of determining a direction information of the movement vector information as left movement vector information when the divided region of the current image data is located to the left and as right movement vector information when the divided region of the current image data is located to the right.

20. A mobile body surrounding surveillance method according to claim 19, wherein the own mobile body is a vehicle, and the left/right determination step includes:

an operation angle increasing determination step of determining whether or not the operation angle of a steering wheel of the own mobile body is increasing;

a detection sensitivity control step of, when the operation angle is increasing, increasing a sensitivity setting threshold used to determine whether or not the other mobile body is approaching the own mobile body based on the movement amount of the movement vector information so as to weaken the detection sensitivity for the movement vector information and, when the operation angle is not increasing, maintaining or decreasing the sensitivity setting threshold so as to maintain or strengthen the detection sensitivity for the movement vector information; and a comparison and determination step of comparing the movement amount of the movement vector information with the sensitivity setting threshold and determines whether or not the movement amount of the movement vector information is greater than or equal to the sensitivity setting threshold so as to determine whether the divided region of the current image data which gives the minimum difference is located to the left or right.

21. A mobile body surrounding surveillance method according to claim 19, wherein the own mobile body is a vehicle, and the left/right determination step includes:

an operation angle increasing determination step of determining whether or not the operation angle of a steering wheel of the own mobile body is increasing;

a detection sensitivity control step of, when the operation angle is increasing, decreasing the sensitivity setting threshold used to determine whether or not the other mobile body is approaching the own mobile body based on the movement amount of the movement vector information so as to strengthen the detection sensitivity for the movement vector information and, when the operation angle is not increasing, maintaining or increasing the sensitivity setting threshold so as to maintain or weaken the detection sensitivity for the movement vector information; and a comparison and determination step of comparing the movement amount of the movement vector information with the sensitivity setting threshold and determines whether or not the movement amount of the movement vector information is greater than or equal to the sensitivity setting threshold so as to determine whether the divided region of the current image data which give the minimum difference is located to the left or right.

22. A computer-readable recording medium having recorded thereon a control program for causing a computer to execute each step of the mobile body surrounding surveillance method according to claim 18.

* * * * *